United States Patent
Chang et al.

(10) Patent No.: US 12,038,986 B2
(45) Date of Patent: Jul. 16, 2024

(54) RECOMMENDATION MODEL TRAINING METHOD, RECOMMENDATION METHOD, APPARATUS, AND COMPUTER-READABLE MEDIUM

(71) Applicant: HUAWEI TECHNOLOGIES CO., LTD., Guangdong (CN)

(72) Inventors: Chih Yao Chang, Shenzhen (CN); Hong Zhu, Shenzhen (CN); Zhenhua Dong, Shenzhen (CN); Xiuqiang He, Shenzhen (CN); Bowen Yuan, Taipei (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 481 days.

(21) Appl. No.: 17/242,588

(22) Filed: Apr. 28, 2021

(65) Prior Publication Data

US 2021/0248651 A1 Aug. 12, 2021

Related U.S. Application Data

(63) Continuation of application No. PCT/CN2019/114897, filed on Oct. 31, 2019.

(51) Int. Cl.
*G06Q 10/10* (2023.01)
*G06F 16/9535* (2019.01)
(Continued)

(52) U.S. Cl.
CPC .......... *G06F 16/9535* (2019.01); *G06F 18/10* (2023.01); *G06F 18/214* (2023.01);
(Continued)

(58) Field of Classification Search
CPC .... G06F 16/9535; G06F 18/10; G06F 18/214; G06F 18/285; G06N 20/00; G06Q 30/0282
(Continued)

(56) References Cited

U.S. PATENT DOCUMENTS

2017/0337326 A1* 11/2017 Zhang .................. G16B 40/00
2019/0205701 A1 7/2019 Huang
(Continued)

FOREIGN PATENT DOCUMENTS

| CN | 105653683 A | 6/2016 |
| CN | 108510326 A | 9/2018 |

(Continued)

*Primary Examiner* — Jonathan P Ouellette
(74) *Attorney, Agent, or Firm* — HUAWEI TECHNOLOGIES CO., LTD.

(57) ABSTRACT

This application provides a recommendation model training method in the artificial intelligence (AI) field. The training method includes: obtaining a first training sample; processing attribute information of a first user and information about a first recommended object based on an interpolation model, to obtain an interpolation prediction label of the first training sample; and performing training by using the attribute information of the first user and the information about the first recommended object as an input to a recommendation model and using the interpolation prediction label of the first training sample as a target output value of the recommendation model, to obtain a trained recommendation model. According to the technical solutions of this application, impact of training data bias on recommendation model training can be alleviated, and recommendation model accuracy can be improved.

16 Claims, 9 Drawing Sheets

(51) Int. Cl.
*G06F 18/10* (2023.01)
*G06F 18/20* (2023.01)
*G06F 18/214* (2023.01)
*G06N 20/00* (2019.01)
*G06Q 10/06* (2023.01)
*G06Q 30/02* (2023.01)
*G06Q 30/0282* (2023.01)
*G06Q 30/06* (2023.01)

(52) U.S. Cl.
CPC .......... *G06F 18/285* (2023.01); *G06N 20/00* (2019.01); *G06Q 30/0282* (2013.01)

(58) Field of Classification Search
USPC .................................................. 705/1.1–912
See application file for complete search history.

(56) References Cited

U.S. PATENT DOCUMENTS

| | | | |
|---|---|---|---|
| 2019/0205704 A1 | 7/2019 | Zhu | |
| 2019/0311114 A1 | 10/2019 | Mei et al. | |
| 2020/0142935 A1* | 5/2020 | Venkatesan | G06F 16/38 |

FOREIGN PATENT DOCUMENTS

| | | | |
|---|---|---|---|
| CN | 109345302 A | 2/2019 | |
| CN | 109460513 A | 3/2019 | |
| CN | 109902708 A | 6/2019 | |
| CN | 110046952 A | 7/2019 | |
| CN | 110097412 A | 8/2019 | |
| CN | 110335064 A | 10/2019 | |
| CN | 110363346 A | 10/2019 | |

* cited by examiner

RECOMMENDATION MODEL TRAINING METHOD, RECOMMENDATION METHOD, APPARATUS, AND COMPUTER-READABLE MEDIUM

CROSS-REFERENCE TO RELATED APPLICATIONS

This application is a continuation of International Application No. PCT/CN2019/114897, filed on Oct. 31, 2019. The disclosures of the aforementioned application is hereby incorporated by reference in its entirety.

TECHNICAL FIELD

Embodiments of this application relate to the artificial intelligence field, and in particular, to a recommendation model training method, a recommendation method, an apparatus, and a computer-readable medium.

BACKGROUND

Commodity selection rate prediction is to predict a probability that a user selects a specific commodity in a specific environment. For example, in a recommendation system of an application such as an application store or an online advertisement, selection rate prediction plays a key role. A quantity of commodities that can be displayed in one recommendation is far less than a total quantity of commodities. The recommendation system usually selects a commodity from candidate commodities for display based on a predicted selection rate.

In the foregoing selection mechanism, training data used to train a recommendation model has bias, and the bias mainly includes location bias and selection bias. The location bias is a common problem in recommendation and search scenarios. The location bias means that collected training data has bias due to a commodity display location difference. For example, in a ranking list in an application market, a same application (APP) may be displayed in the first place, or may be displayed in the last place. According to a random launch policy, it can be verified that a download rate of the app displayed in the first place is far higher than a download rate of the app displayed in the last place. The selection bias means that collected training data has bias due to a commodity display probability difference. Ideal training data is obtained when commodities are displayed to the user at a same display probability. In reality, the commodities displayed to the user are determined based on selection rates previously predicted by a recommendation model, and display opportunities of the commodities are different.

For example, in a ranking list in an application market, the user is more prone to download an app with a higher ranking. A selection rate that is of the app with the higher ranking and that is calculated by a recommendation model may be higher than that of another app, and therefore, the app ranks higher than the another app. This intensifies impact of a bias problem, and causes a Matthew effect. Consequently, a long tail problem is aggravated.

Using training data with bias to train a recommendation model reduces model training accuracy and affects user experience and revenues.

SUMMARY

This application provides a recommendation model training method, a recommendation method, an apparatus, and a computer-readable medium, to improve accuracy of a recommendation model.

According to a first aspect, a recommendation model training method is provided. The training method includes: obtaining at least one first training sample, where the first training sample includes attribute information of a first user and information about a first recommended object; processing the attribute information of the first user and the information about the first recommended object based on an interpolation model, to obtain an interpolation prediction label of the first training sample, where the interpolation prediction label is used to indicate prediction about whether the first user performs an operational action on the first recommended object when the first recommended object is recommended to the first user, a model parameter of the interpolation model is obtained by performing training based on at least one second training sample, the at least one second training sample includes attribute information of a second user, information about a second recommended object, and a sample label of the second training sample, the sample label of the second training sample is used to indicate whether the second user performs an operational action on the second recommended object, and the second training sample is obtained when the second recommended object is randomly displayed to the second user; and performing training by using the attribute information of the first user and the information about the first recommended object in the first training sample as an input to the recommendation model and using the interpolation prediction label of the first training sample as a target output value of the recommendation model, to obtain a trained recommendation model.

The first recommended object and the second recommended object may be recommended applications in an application market on a terminal device. Alternatively, the first recommended object and the second recommended object may be search terms recommended by a system in a search scenario. In this embodiment of this application, the first recommended object and the second recommended object may be information recommended by a recommendation system to a user. Specific implementations of the first recommended object and the second recommended object are not limited in this application.

User attribute information may include some personalized attributes of a user, for example, a gender of the user, an age of the user, an occupation of the user, an income of the user, a hobby of the user, and an educational level of the user. The attribute information of the first user may include one or more items in the foregoing user attribute information. The attribute information of the second user may include one or more items in the foregoing user attribute information.

Information about a recommended object includes an identifier of the recommended object, for example, an ID of the recommended object. The information about the recommended object further includes some attributes of the recommended object, for example, a name of the recommended object and a type of the recommended object. The information about the first recommended object may include one or more items in the foregoing information about the recommended object. The information about the second recommended object may include one or more items in the foregoing information about the recommended object.

Operational actions performed by the user on the recommended object may include clicking behavior of the user, downloading behavior of the user, purchasing behavior of the user, browsing behavior of the user, and negative comment behavior of the user.

The interpolation model may be used to predict whether the first user performs an operational action on the first recommended object when the first recommended object is recommended to the first user. The interpolation prediction label may indicate a result of the prediction.

In an embodiment, the interpolation prediction label may be 0 or 1. In other words, 0 or 1 is used to indicate whether the first user performs an operational action on the first recommended object. The interpolation prediction label may alternatively be a probability value. In other words, the probability value is used to represent a probability that the first user performs an operational action on the first recommended object. A form of the interpolation prediction label is not limited in this application.

In an embodiment, the interpolation model may be an advertisement average click-through rate model, a logistic regression model, a field-aware factorization machine, a deep neural network, or the like.

In an embodiment, the recommendation model may be a matrix factorization model, a factorization machine, a field-aware factorization machine, or the like.

According to the solutions in this embodiment of this application, the second training sample is obtained when the second recommended object is randomly displayed to the second user, the training sample has no bias, and the interpolation model is trained by using the second training sample, so that impact of a bias problem on interpolation model training can be avoided, and interpolation model accuracy can be improved. In this way, the obtained interpolation prediction label is more accurate. Further, the recommendation model is trained by using the more accurate interpolation prediction label, so that recommendation model accuracy can be improved.

In an embodiment, the method further includes: obtaining at least one third training sample, where the third training sample includes attribute information of a third user, information about a third recommended object, and a sample label of the third training sample, and the sample label of the third training sample is used to indicate whether the third user performs an operational action on the third recommended object; and the performing training by using the attribute information of the first user and the information about the first recommended object as an input to a recommendation model and using the interpolation prediction label of the first training sample as a target output value of the recommendation model, to obtain a trained recommendation model includes: performing training based on a target training model by using the attribute information of the first user, the information about the first recommended object, the attribute information of the third user, and the information about the third recommended object as the input to the recommendation model and using the interpolation prediction label of the first training sample and the sample label of the third training sample as the target output value of the recommendation model, to obtain the trained recommendation model.

The attribute information of the third user may include one or more items in the foregoing user attribute information. The information about the third recommended object may include one or more items in the foregoing information about the recommended object.

The third training sample may be the same as or different from the second training sample.

According to the solutions in this embodiment of this application, the first training sample and the third training sample are used together to train the recommendation model, so that both a function of the interpolation prediction label obtained through the interpolation model and a function of an actual sample label in the training process are considered. This avoids a case in which the recommendation model accuracy depends on only accuracy of the interpolation prediction label, and further improves the recommendation model accuracy.

In an embodiment, the first training sample may be obtained when the first recommended object is not displayed to the first user, and the third training sample may be obtained when the third recommended object is displayed to the third user.

The first training sample may be obtained when the first recommended object is not displayed to the first user. To be specific, the first training sample has no feedback information about whether the first user performs an operational action on the first recommended object, and the first training sample has no actual sample label.

According to the solutions in this embodiment of this application, when the first recommended object is not displayed to the first user, the interpolation prediction label is added to the first training sample, so that a fact that does not occur can be incorporated into modeling, and used together with a fact that occurs, to train the recommendation model. In other words, the first training sample without a sample label and the third training sample with the sample label are used together to train the recommendation model. Therefore, sample distribution can be more proper, and recommendation model accuracy can be improved.

In an embodiment, the target training model includes a first loss function and a second loss function, the first loss function is used to indicate a difference between the interpolation prediction label of the first training sample and a prediction label of the first training sample, and the second loss function is used to indicate a difference between the sample label of the third training sample and a prediction label of the third training sample.

A model parameter obtained through the target training model is a model parameter of the trained recommendation model.

In an embodiment, the target training model is:

$$\min_{W} \lambda R(W) + \sum_{l=1}^{L} \ell(y_l, \hat{y}_l) + \omega \sum_{l=L+1}^{\hat{L}} \ell(\sigma_l, \hat{y}_l).$$

Herein, W is a parameter of the recommendation model, R(W) is a regular term, $\lambda$ represents a hyperparameter that determines a weight of the regular term, a training sample $x^1$ to a training sample $x^L$ in a training sample set $\{x^1, x^2, \ldots x^L, x^{L+1}, x^{L+2}, \ldots x^{\hat{L}}\}$ are the third training sample, a training sample $x^{L+1}$ to a training sample $x^{\hat{L}}$ are the first training sample, $\hat{L}$ represents a quantity of training samples in the training sample set, L represents a quantity of third training samples in the training sample set, $\sigma_l$ represents an interpolation prediction label $\sigma(x^l)$ of a training sample $x^l$, $y_l$ represents a sample label of the training sample $x^l$, $\hat{y}_l$ represents a prediction label of the training sample $x^l$, $\ell(y_l, \hat{y}_l)$ represents the second loss function, $\ell(\sigma_l, \hat{y}_l)$ represents the first loss function, and $\omega$ is a hyperparameter and is used to adjust weights of the first loss function and the second loss function.

It should be understood that the training sample $x^1$ to the training sample $x^L$ are L different third training samples, and the training sample $x^{L+1}$ to the training sample $x^{\hat{L}}$ are $\hat{L}-L$ different first training samples.

According to the solutions in this embodiment of this application, the interpolation model is trained by using the second training sample. In other words, the interpolation model is trained by using a training sample without bias. In addition, the first loss function and the second loss function are introduced into the target training model, and the weights of the first loss function and the second loss function in the target training model can be adjusted by setting different hyperparameters, to further improve recommendation model accuracy. For example, the model parameter of the interpolation model is obtained through training based on the second training sample. When there are a relatively large quantity of second training samples, the second training samples are relatively representative, so that the interpolation model can more accurately fit unbiased data distribution, and accuracy of the obtained interpolation model is relatively high. In this case, the weight of the second loss function may be higher than the weight of the first loss function. In other words, a value of ω may be greater than 1.

In an embodiment, the interpolation model is selected based on a quantity of second training samples.

For example, when there is a relatively large quantity of second training samples, the second training samples are relatively representative, and the interpolation model may be trained by using a relatively complex model or by using more training features, so that the interpolation model can more accurately fit unbiased data distribution. The relatively complex model may be a logistic regression model, a field-aware factorization machine, a deep neural network, or the like. When there are a relatively small quantity of second training samples, the second training samples are relatively unrepresentative, and the interpolation model may be trained by using a relatively simple model or by using fewer training features, to avoid that the interpolation model overfits unbiased data distribution. For example, the relatively simple model may be an advertisement average click-through rate model.

For example, in an application scenario of an application market, when the quantity of second training samples is greater than 100,000, the interpolation model may be a field-aware factorization machine, a deep neural network, or the like. When the quantity of second training samples is between 10,000 and 100,000, the interpolation model may be a logistic regression model. When the quantity of second training samples is less than 10,000, the interpolation model may be an advertisement average click-through rate model.

According to the solutions in this embodiment of this application, in a training process, the interpolation model may be selected based on the quantity of second training samples. Different thresholds may be set for different application scenarios to select the interpolation model, and the interpolation model may be flexibly adjusted. Only a small quantity of second training samples are required to alleviate impact caused by a bias problem and improve recommendation model accuracy. This avoids a case in which overall system revenues decrease because a large quantity of recommended objects are randomly displayed for large-scale collection of second training samples.

According to a second aspect, a recommendation method is provided, including: obtaining attribute information of a target recommendation user and information about a candidate recommended object; and inputting the attribute information of the target recommendation user and the information about the candidate recommended object into a recommendation model, and predicting a probability that the target recommendation user performs an operational action on the candidate recommended object, where a model parameter of the recommendation model is obtained by performing training by using attribute information of a first user and information about a first recommended object in a first training sample as an input to the recommendation model and using an interpolation prediction label of the first training sample as a target output value of the recommendation model, the interpolation prediction label of the first training sample is obtained by processing the attribute information of the first user and the information about the first recommended object based on an interpolation model, the interpolation prediction label is used to indicate prediction about whether the first user performs an operational action on the first recommended object when the first recommended object is recommended to the first user, a model parameter of the interpolation model is obtained by performing training based on at least one second training sample, the second training sample includes attribute information of a second user, information about a second recommended object, and a sample label of the second training sample, the sample label of the second training sample is used to indicate whether the second user performs an operational action on the second recommended object, and the second training sample is obtained when the second recommended object is randomly displayed to the second user.

The attribute information of the target recommendation user includes some personalized attributes of the user, for example, a gender of the target recommendation user, an age of the target recommendation user, an occupation of the target recommendation user, an income of the target recommendation user, a hobby of the target recommendation user, and an educational level of the target recommendation user The information about the candidate recommended object includes an identifier of the candidate recommended object, for example, an ID of the candidate recommended object.

The information about the candidate recommended object further includes some attributes of the candidate recommended object, for example, a name of the candidate recommended object and a type of the candidate recommended object.

According to the solutions in this embodiment of this application, the attribute information of the target recommendation user and the information about the candidate recommended object are input into the recommendation model, and the probability that the target recommendation user performs an operational action on the candidate recommended object is predicted. The model parameter of the recommendation model is obtained by performing training by using the attribute information of the first user and the information about the first recommended object in the first training sample as the input to the recommendation model and using the interpolation prediction label of the first training sample as the target output value of the recommendation model. The interpolation model used to obtain the interpolation prediction label is obtained by performing training based on a training sample without bias. This can avoid impact of a bias problem on interpolation model training and improve interpolation model accuracy, so that the obtained interpolation prediction label is more accurate. Further, the recommendation model is trained by using the more accurate interpolation prediction label. In this way, a more accurate probability that the target recommendation user performs an operational action on the target recommendation user is predicted by using the trained recommendation model.

In an embodiment, that a model parameter of the recommendation model is obtained by performing training by using attribute information of a first user and information about a first recommended object in a first training sample as an input to the recommendation model and using an interpolation prediction label of the first training sample as a target output value of the recommendation model includes: The model parameter of the recommendation model is obtained based on a target training model by using the attribute information of the first user, the information about the first recommended object, and attribute information of a third user and information about a third recommended object in a third training sample as the input to the recommendation model and using the interpolation prediction label of the first training sample and a sample label of the third training sample as the target output value of the recommendation model. The sample label of the third training sample is used to indicate whether the third user performs an operational action on the third recommended object.

According to the solutions in this embodiment of this application, the first training sample and the third training sample are used together to train the recommendation model, so that both a function of the interpolation prediction label obtained through the interpolation model and a function of an actual sample label in the training process are considered. This avoids a case in which the recommendation model accuracy depends on only accuracy of the interpolation prediction label, and further improves the recommendation model accuracy. In this way, a more accurate probability that the target recommendation user performs an operational action on the target recommendation user is predicted by using the trained recommendation model.

In an embodiment, the first training sample may be obtained when the first recommended object is not displayed to the first user, and the third training sample may be obtained when the third recommended object is displayed to the third user.

The first training sample may be obtained when the first recommended object is not displayed to the first user. To be specific, the first training sample has no feedback information about whether the first user performs an operational action on the first recommended object, and the first training sample has no actual sample label.

According to the solutions in this embodiment of this application, when the first recommended object is not displayed to the first user, the interpolation prediction label is added to the first training sample, so that a fact that does not occur can be incorporated into modeling, and used together with a fact that occurs, to train the recommendation model. In other words, the first training sample without a sample label and the third training sample with the sample label are used together to train the recommendation model. Therefore, sample distribution can be more proper, and recommendation model accuracy can be improved. In this way, a more accurate probability that the target recommendation user performs an operational action on the target recommendation user is predicted by using the trained recommendation model.

In an embodiment, the target training model includes a first loss function and a second loss function, the first loss function is used to indicate a difference between the interpolation prediction label of the first training sample and a prediction label of the first training sample, and the second loss function is used to indicate a difference between the sample label of the third training sample and a prediction label of the third training sample.

A model parameter obtained through the target training model is a model parameter of the trained recommendation model.

In an embodiment, the target training model is:

$$\min_{W} \lambda R(W) + \sum_{l=1}^{L} \ell(y_l, \hat{y}_l) + \omega \sum_{l=L+1}^{\hat{L}} \ell(\sigma_l, \hat{y}_l).$$

Herein, W is a parameter of the recommendation model, R(W) is a regular term, λ represents a hyperparameter that determines a weight of the regular term, a training sample $x^1$ to a training sample $x^L$ in a training sample set $\{x^1, x^2, \ldots x^L, x^{L+1}, x^{L+2}, \ldots x^{\hat{L}}\}$ are the third training sample, a training sample $x^{L+1}$ to a training sample $x^{\hat{L}}$ are the first training sample, $\hat{L}$ represents a quantity of training samples in the training sample set, L represents a quantity of third training samples in the training sample set, $\sigma_l$ represents an interpolation prediction label $\sigma(x^l)$ of a training sample $x^l$, $y_l$ represents a sample label of the training sample $x^l$, $\hat{y}_l$ represents a prediction label of the training sample $x^l$, $\ell(y_l, \hat{y}_l)$ represents the second loss function, $\ell(\sigma_l, \hat{y}_l)$ represents the first loss function, and ω is a hyperparameter and is used to adjust weights of the first loss function and the second loss function.

It should be understood that the training sample $x^1$ to the training sample $x^L$ are L different third training samples, and the training sample $x^{L+1}$ to the training sample $x^{\hat{L}}$ are $\hat{L}$–L different first training samples.

According to the solutions in this embodiment of this application, the interpolation model is trained by using the second training sample. In other words, the interpolation model is trained by using a training sample without bias. In addition, the first loss function and the second loss function are introduced into the target training model, and the weights of the first loss function and the second loss function in the target training model can be adjusted by setting different hyperparameters, to further improve recommendation model accuracy. For example, the model parameter of the interpolation model is obtained through training based on the second training sample. When there are a relatively large quantity of second training samples, the second training samples are relatively representative, so that the interpolation model can more accurately fit unbiased data distribution, and accuracy of the obtained interpolation model is relatively high. In this case, the weight of the second loss function may be higher than the weight of the first loss function. In other words, a value of ω may be greater than 1. Only a small quantity of second training samples are required to alleviate impact caused by a bias problem and improve recommendation model accuracy. This avoids a case in which overall system revenues decrease because a large quantity of recommended objects are randomly displayed for large-scale collection of second training samples. A more accurate probability that the target recommendation user performs an operational action on the candidate recommended object is predicted by using the recommendation model.

In an embodiment, the interpolation model is selected based on a quantity of second training samples.

For example, when there are a relatively large quantity of second training samples, the second training samples are relatively representative, and the interpolation model may be trained by using a relatively complex model or by using more training features, so that the interpolation model can more accurately fit unbiased data distribution. The relatively complex model may be a logistic regression model, a field-aware factorization machine, a deep neural network, or the like. When there are a relatively small quantity of second training samples, the second training samples are relatively unrepresentative, and the interpolation model may be trained by using a relatively simple model or by using fewer training features, to avoid that the interpolation model overfits unbiased data distribution. For example, the relatively simple model may be an advertisement average click-through rate model.

For example, in an application scenario of an application market, when the quantity of second training samples is greater than 100,000, the interpolation model may be a field-aware factorization machine, a deep neural network, or the like. When the quantity of second training samples is between 10,000 and 100,000, the interpolation model may be a logistic regression model. When the quantity of second training samples is less than 10,000, the interpolation model may be an advertisement average click-through rate model.

According to the solutions in this embodiment of this application, in a training process, the interpolation model may be selected based on the quantity of second training samples. Different thresholds may be set for different application scenarios to select the interpolation model, and the interpolation model may be flexibly adjusted. Only a small quantity of second training samples are required to alleviate impact caused by a bias problem and improve recommendation model accuracy. This avoids a case in which overall system revenues decrease because a large quantity of recommended objects are randomly displayed for large-scale collection of second training samples.

According to a third aspect, a recommendation model training apparatus is provided. The apparatus includes modules/units configured to perform the method in any one of the first aspect or the implementations of the first aspect.

According to a fourth aspect, a recommendation apparatus is provided. The apparatus includes modules/units configured to perform the method in any one of the second aspect or the implementations of the second aspect.

According to a fifth aspect, a recommendation model training apparatus is provided, including an input/output interface, a processor, and a memory. The processor is configured to control the input/output interface to send and receive information. The memory is configured to store a computer program. The processor is configured to invoke the computer program from the memory and run the computer program, so that the training apparatus performs the method in any one of the first aspect or the implementations of the first aspect.

In an embodiment, the training apparatus may be a terminal device/server, or may be a chip in the terminal device/server.

In an embodiment, the memory may be located in the processor, and for example, may be a cache (cache) in the processor. The memory may alternatively be located outside the processor and independent of the processor, and for example, may be an internal memory (memory) of the training apparatus.

According to a sixth aspect, a recommendation apparatus is provided, including an input/output interface, a processor, and a memory. The processor is configured to control the input/output interface to send and receive information. The memory is configured to store a computer program. The processor is configured to invoke the computer program from the memory and run the computer program, so that the apparatus performs the method in any one of the second aspect or the implementations of the second aspect.

In an embodiment, the apparatus may be a terminal device/server, or may be a chip in the terminal device/server.

In an embodiment, the memory may be located in the processor, and for example, may be a cache (cache) in the processor. The memory may alternatively be located outside the processor and independent of the processor, and for example, may be an internal memory (memory) of the apparatus.

According to a seventh aspect, a computer program product is provided. The computer program product includes computer program code, and when the computer program code is run on a computer, the computer is enabled to perform the methods in the foregoing aspects.

It should be noted that some or all of the computer program code may be stored in a first storage medium. The first storage medium may be encapsulated with a processor, or may be encapsulated separately from a processor. This is not limited in the embodiments of this application.

According to an eighth aspect, a computer-readable medium is provided. The computer-readable medium stores program code, and when the computer program code is run on a computer, the computer is enabled to perform the methods in the foregoing aspects.

DESCRIPTION OF EMBODIMENTS

The following describes technical solutions of this application with reference to accompanying drawings.

Figure 1:
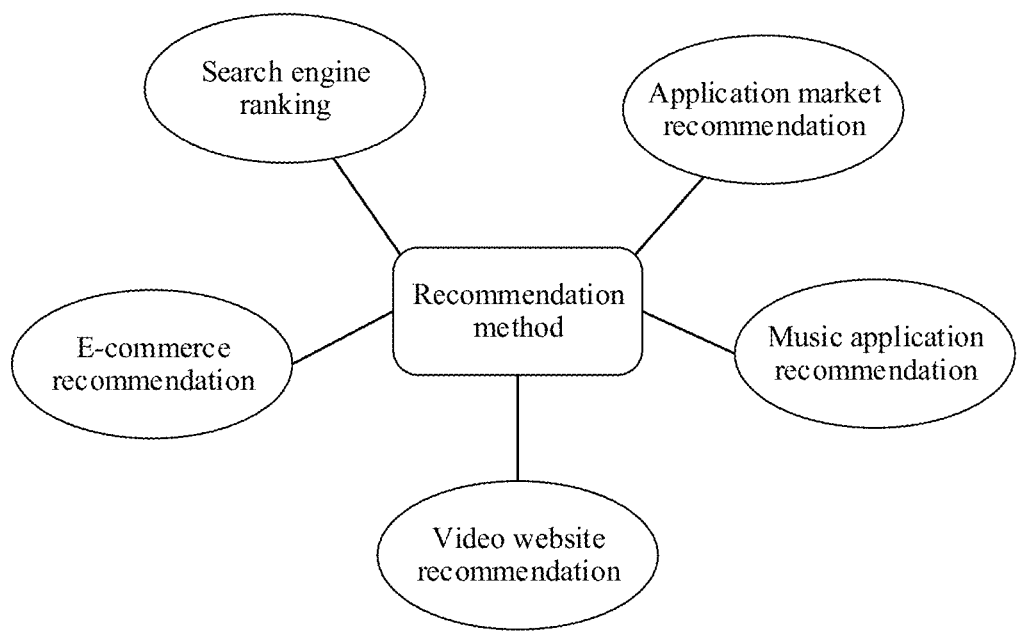
FIG. 1 is a schematic diagram of an application scenario according to an embodiment of this application.

FIG. 1 shows some application scenarios according to an embodiment of this application. A recommendation method provided in the embodiments of this application is applicable to all scenarios in which recommendation is required. For example, as shown in FIG. 1, the recommendation method provided in the embodiments of this application is applicable to scenarios such as an application market recommendation scenario, a music application recommendation scenario, a video website recommendation scenario, an e-commerce recommendation scenario, and a search engine ranking scenario in which recommendation is required. The following briefly describes two common application scenarios.

Application Scenario 1: Application Market Recommendation

Some applications may be displayed in an application market. A recommendation system may be configured to determine a to-be-displayed application and a corresponding display location of the application. For example, in a cost per click (CPC) system, an advertiser needs to pay only when an application is clicked by a user. When the user enters the application market, a recommendation request is triggered. Due to an application display location limitation, when receiving the recommendation request, the recommendation system may rank all to-be-displayed applications based on expected revenues, then select one or more most valuable applications, and display the applications at corresponding display locations. In the CPC system, expected revenues of each application are related to a predicted click-through rate (CTR) of the application. In this case, the CTR may be understood as a probability that each app is clicked. To rank expected revenues, predicted CTRs need to be obtained.

Specifically, predicted CTRs of all the to-be-displayed applications are obtained, the expected revenues of all the applications are calculated and ranked based on the predicted CTRs of the applications, and a to-be-displayed application and a corresponding display location of the application are determined based on a ranking result.

The predicted CTRs of all the to-be-displayed applications may be obtained according to the recommendation method in the embodiments of this application. All the to-be-displayed applications can be ranked based on the obtained predicted CTRs, and then the to-be-displayed application and the corresponding display location can be determined based on the ranking result.

Application Scenario 2: Search Term Recommendation

When a user performs search, search terms usually include: a search term actively entered by the user and a search term recommended by a system to the user. Behavior that the user actively enters the search term is user behavior that the system cannot intervene. The search term recommended by the system to the user means: When receiving a recommendation request, the recommendation system may calculate scores of all to-be-displayed search terms, and rank the scores. For example, the score of the search term may be a click-through rate of the search term. A to-be-displayed search term and a corresponding display location of the search term can be determined based on a ranking result.

The scores of all the search terms may be calculated according to the recommendation method in the embodiments of this application. All the to-be-displayed search terms can be ranked based on the obtained scores, and then the to-be-displayed search term and the corresponding display location can be determined based on the ranking result.

To facilitate understanding of the embodiments of this application, the following first describes related concepts of related terms in the embodiments of this application.

(1) Recommendation System

The recommendation system performs analysis based on historical data of a user by using a machine learning algorithm, and perform prediction for a new recommendation request based on an analysis result to obtain a recommendation result.

Figure 2:
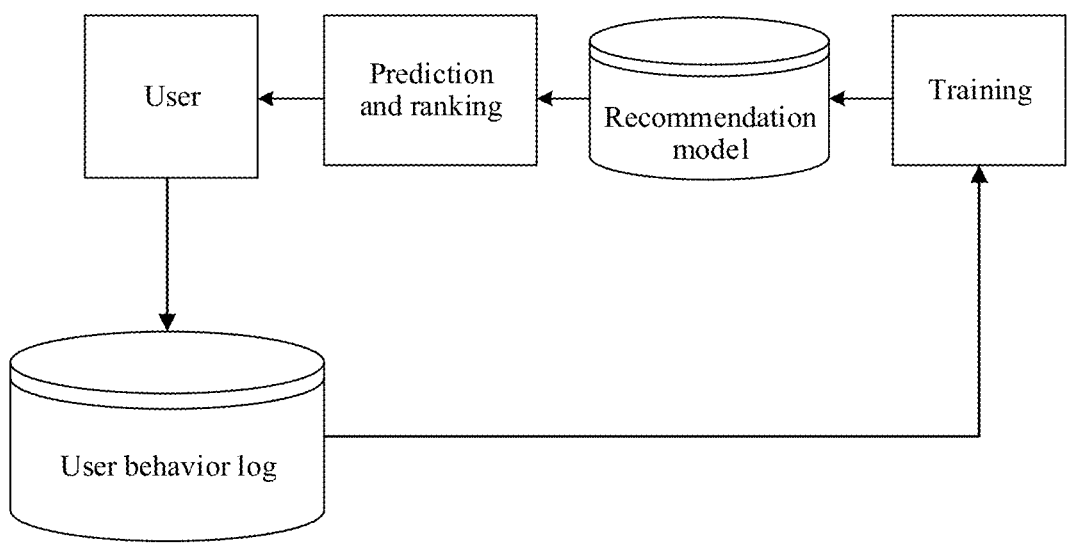
FIG. 2 is an architectural diagram of a recommendation system according to an embodiment of this application.

For example, FIG. 2 is an architectural diagram of a recommendation system according to an embodiment of this application. When the user enters the system, a recommendation request is triggered. The recommendation system inputs the recommendation request and related information into a recommendation model to predict a selection rate of the user for a commodity in the system. Further, commodities are ranked based on predicted selection rates or functions of the selection rates. The recommendation system may use a commodity to be displayed to the user and a commodity display location as a recommendation result for the user based on a ranking result. The user browses the displayed commodity and may perform an operational action, such as browsing behavior or downloading behavior. The operational action of the user may be stored in a user behavior log, and training data may be obtained by preprocessing the user behavior log. The training data may be used to continuously update a parameter of the recommendation model, to improve a prediction effect of the recommendation model.

For example, when the user opens an application market in an intelligent terminal (for example, a mobile phone), a recommendation system in the application market may be triggered, that is, a recommendation request may be triggered. The recommendation system may predict, based on a historical behavior log of the user, for example, a historical download record of the user, and a feature of the application market, for example, environment feature information such as a time and a location, a probability that the user downloads each recommended candidate application. The recommendation system may display candidate applications in descending order of predicted probabilities, to improve download probabilities of the candidate applications.

For example, when there are p display locations in the application market (where p is a positive integer), the recommendation system may select p candidate applications with highest predicted probabilities for display, display an application with a higher predicted probability in the p candidate applications at a higher-ranking location, and display an application with a lower predicted user selection rate in the p candidate applications at a lower-ranking location.

Exposure data is recorded user browsing behavior data.

A single-class model is a model in which only one class of data in a training sample is clear.

Context information may be background information, for example, a city, an occupation, a price, or a category, of the user and/or a recommended object in the recommendation request.

The foregoing recommendation model may be a neural network model. The following describes related terms and concepts of a neural network that may be used in the embodiments of this application.

(2) Neural Network

The neural network may include neurons. The neuron may be an operation unit that uses $x_s$ and an intercept 1 as an input, and an output of the operation unit may be shown in formula (1):

$$h_{W,b}(x) = f(W^T x) = f\left(\sum_{s=1}^{n} W_s x_s + b\right) \tag{1}$$

Herein, s=1, 2, ..., or n, n is a natural number greater than 1, $W_s$ is a weight of $x_s$, and b is bias of the neuron. f is an activation function (activation functions) of the neuron, and the activation function is used to perform non-linear transformation on a feature in the neural network, to convert an input signal in the neuron into an output signal. The output signal of the activation function may be used as an input of a next convolution layer. The activation function may be a sigmoid function. The neural network is a network formed by joining many single neurons together. To be specific, an output of a neuron may be an input of another neuron. An input of each neuron may be connected to a local receptive field of a previous layer to extract a feature of the local receptive field. The local receptive field may be a region including several neurons.

(3) Deep Neural Network

The deep neural network (DNN) is also referred to as a multi-layer neural network, and may be understood as a neural network having a plurality of hidden layers. The DNN is divided based on locations of different layers, and a neural network in the DNN may be divided into three types: an input layer, a hidden layer, and an output layer. Usually, the first layer is the input layer, the last layer is the output layer, and layers in the middle are all hidden layers. Layers are fully connected. To be specific, any neuron at the $i^{th}$ layer is certainly connected to any neuron at the $(i+1)^{th}$ layer.

Although the DNN seems to be complex, the DNN is actually not complex in terms of work at each layer, and is simply expressed as the following linear relationship expression: $\vec{y}=\alpha(W \cdot \vec{x}+\vec{b})$, where $\vec{x}$ is an input vector, $\vec{y}$ is an output vector, $\vec{b}$ is a bias vector, W is a weight matrix (also referred to as a coefficient), and $\alpha(\ )$ is an activation function. At each layer, the output vector y is obtained by performing such a simple operation on the input vector $\vec{x}$. Because there are a large quantity of layers in the DNN, there are also a relatively large quantity of coefficients W and bias vectors $\vec{b}$. Definitions of these parameters in the DNN are as follows: The coefficient W is used as an example. It is assumed that in a DNN having three layers, a linear coefficient from the fourth neuron at the second layer to the second neuron at the third layer is defined as $W_{24}^3$. The superscript 3 represents a layer at which the coefficient W is located, and the subscript corresponds to an output third-layer index 2 and an input second-layer index 4.

In conclusion, a coefficient from the $k^{th}$ neuron at the $(L-1)^{th}$ layer to the $j^{th}$ neuron at the $L^{th}$ layer is defined as $W_{jk}^L$.

It should be noted that there is no parameter W at the input layer. In the deep neural network, more hidden layers make the network more capable of describing a complex case in the real world. Theoretically, a model having a larger quantity of parameters indicates higher complexity and a larger "capacity", and indicates that the model can complete a more complex learning task. Training the deep neural network is a process of learning a weight matrix, and a final objective of the training is to obtain a weight matrix of all layers of the trained deep neural network (a weight matrix including vectors W at many layers).

(4) Loss Function

In a process of training the deep neural network, because it is expected that an output of the deep neural network is as much as possible close to a predicted value that is actually expected, a predicted value of a current network and a target value that is actually expected may be compared, and then a weight vector of each layer of the neural network is updated based on a difference between the predicted value and the target value (certainly, there is usually an initialization process before the first update, to be specific, parameters are preconfigured for all layers of the deep neural network). For example, if the predicted value of the network is large, the weight vector is adjusted to decrease the predicted value, and adjustment is continuously performed, until the deep neural network can predict the target value that is actually expected or a value that is very close to the target value that is actually expected. Therefore, "how to obtain, through comparison, a difference between a predicted value and a target value" needs to be predefined. This is the loss function (loss function) or an objective function (objective function). The loss function and the objective function are important equations used to measure the difference between the predicted value and the target value. The loss function is used as an example. A higher output value (loss) of the loss function indicates a larger difference, and therefore, training of the deep neural network is a process of reducing the loss as much as possible.

(5) Back Propagation Algorithm

The neural network may correct a value of a parameter in an initial neural network model in a training process by using an error back propagation (BP) algorithm, so that an error loss of reconstructing the neural network model becomes small. Specifically, an input signal is transferred forward until an error loss occurs at an output, and the parameter in the initial neural network model is updated based on back propagation error loss information, to make the error loss converge. The back propagation algorithm is an error-loss-centered back propagation motion intended to obtain a parameter, such as a weight matrix, of an optimal neural network model.

Figure 3:
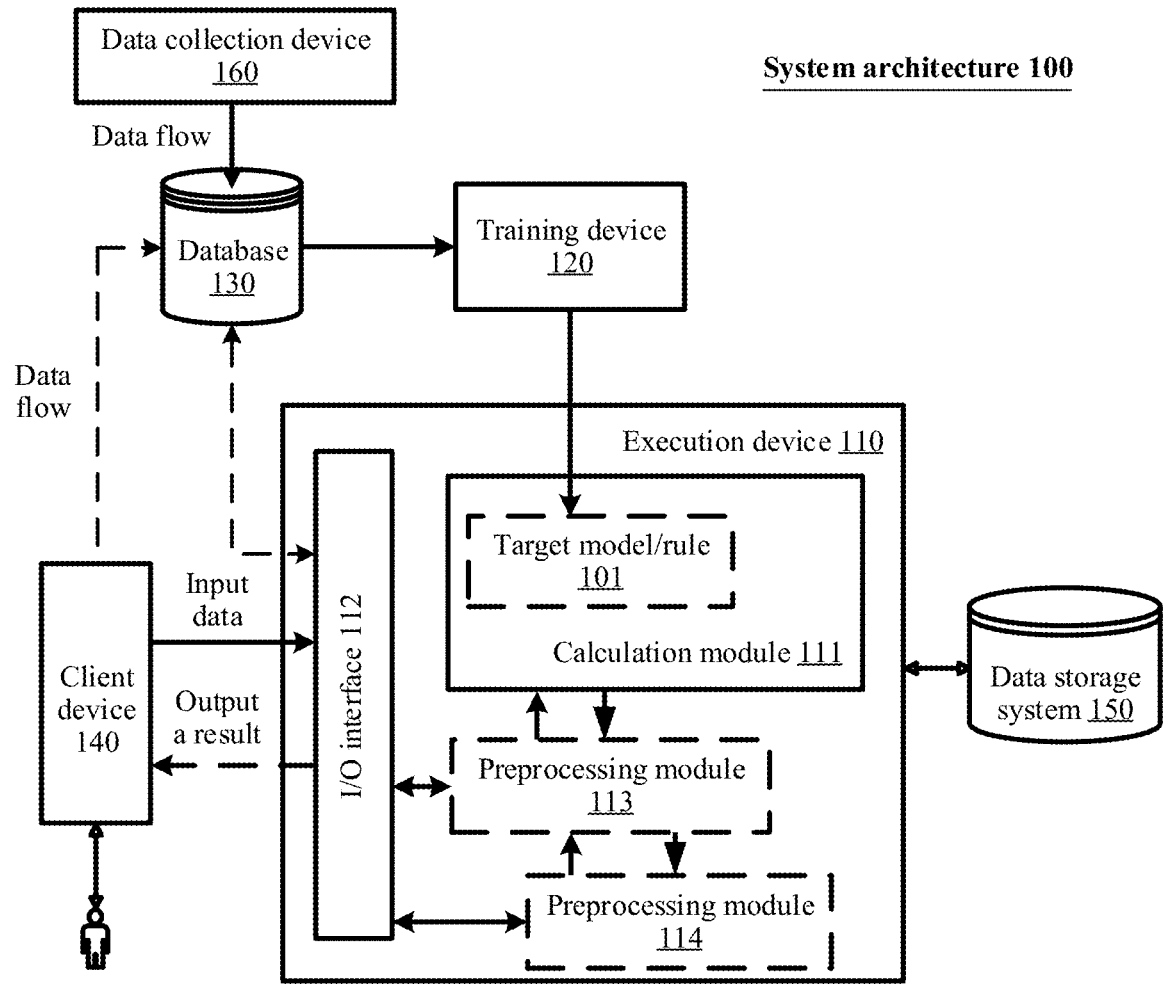
FIG. 3 is a schematic structural diagram of a system architecture according to an embodiment of this application.

The following describes in detail a system architecture in an embodiment of this application with reference to FIG. 3.

FIG. 3 is a schematic diagram of a system architecture according to an embodiment of this application. As shown in FIG. 3, the system architecture 100 includes an execution device 110, a training device 120, a database 130, a client device 140, a data storage system 150, and a data collection system 160.

In addition, the execution device 110 includes a calculation module 111, an I/O interface 112, a preprocessing module 113, and a preprocessing module 114. The calculation module 111 may include a target model/rule 101, and the preprocessing module 113 and the preprocessing module 114 are optional.

The data collection device 160 is configured to collect training data. In a recommendation model training method in the embodiments of this application, a recommendation model may be further trained based on the training data.

For example, in this embodiment of this application, the training data may include a training sample and a sample label of the training sample. The training sample may include attribute information of a user and information about a recommended object. The sample label indicates whether the user performs an operational action on the recommended object. Whether the user performs an operational action on the recommended object may be understood as whether the user in the training sample selects the recommended object.

After collecting the training data, the data collection device 160 stores the training data in the database 130. The training device 120 performs training based on the training data maintained in the database 130, to obtain the target model/rule 101.

The following describes how the training device 120 obtains the target model/rule 101 based on the training data. The training device 120 processes the input attribute information of the user and the information about the recommended object, and compares an output prediction label with the sample label, until a difference between the prediction label output by the training device 120 and the sample label is less than a specific threshold, to obtain a trained recommendation model. In other words, the trained recommendation model may be training of the target model/rule 101.

The target model/rule 101 can be used to predict whether the user selects the recommended object or predict a probability that the user selects the recommended object. The target model/rule 101 in this embodiment of this application may be a neural network, a logistic regression model, or the like.

It should be noted that, in actual application, the training data maintained in the database 130 is not necessarily collected by the data collection device 160, but may be received from another device. In addition, it should be noted that the training device 120 does not necessarily perform training completely based on the training data maintained in the database 130 to obtain the target model/rule 101, but may obtain training data from a cloud or another place to perform model training. The foregoing description shall not be construed as a limitation on this embodiment of this application.

The target model/rule 101 obtained by the training device 120 through training may be applied to different systems or devices, for example, applied to the execution device 110 shown in FIG. 3. The execution device 110 may be a terminal, such as a mobile phone terminal, a tablet computer, a notebook computer, an augmented reality (augmented reality, AR) terminal, a virtual reality (virtual reality, VR) terminal, or a vehicle-mounted terminal, or may be a server, a cloud, or the like. In FIG. 3, the execution device 110 is provided with the input/output (input/output, I/O) interface 112, configured to exchange data with an external device. A user may input data to the I/O interface 112 through the client device 140. The input data in this embodiment of this application may include training data input through the client device. The client device 140 herein may be a terminal device.

The preprocessing module 113 and the preprocessing module 114 are configured to perform preprocessing based on the input data received by the I/O interface 112. In this embodiment of this application, the preprocessing module 113 and the preprocessing module 114 may not exist, or there may be only one preprocessing module. When the preprocessing module 113 and the preprocessing module 114 do not exist, the calculation module 111 may be directly used to process the input data.

In a process in which the execution device 110 preprocesses the input data, or in a process in which the calculation module 111 of the execution device 110 performs related processing such as calculation or the like, the execution device 110 may invoke data, code, and the like in the data storage system 150 for corresponding processing, and may further store, in the data storage system 150, data, an instruction, and the like that are obtained through the corresponding processing.

Finally, the I/O interface 112 provides a processing result for the user. For example, in a recommendation system, the target model/rule 101 may be used to predict whether the target recommendation user selects a candidate recommended object or a probability of selecting a candidate recommended object, and obtain a recommendation result based on whether the target recommendation user selects the candidate recommended object or the probability of selecting the candidate recommended object. The recommendation result is presented to the client device 140, so that the recommendation result is provided for the user.

For example, in an embodiment of this application, the recommendation result may be a recommendation sequence of candidate recommended objects that is obtained based on the probability that the target recommendation user selects the candidate recommended object, or the recommendation result may be a target recommended object obtained based on the probability that the target recommendation user selects the candidate recommended object. The target recommended object may be one or more candidate recommended objects with highest probabilities.

It should be understood that, when the preprocessing module 113 and the preprocessing module 114 do not exist in the system architecture 100, the calculation module 111 may further transmit, to the I/O interface, a commodity that is obtained through processing and that has a relatively high ranking, and then the I/O interface sends the commodity with the relatively high ranking to the client device 140 for display.

It should be noted that the training device 120 may generate, based on different training samples, corresponding target models/rules 101 for different targets or different tasks. The corresponding target models/rules 101 may be used to implement the foregoing targets or complete the foregoing tasks, to provide a desired result for the user.

In a case shown in FIG. 3, the user may manually provide the input data. The manual provision may be performed in a user interface provided by the I/O interface 112.

In another case, the client device 140 may automatically send the input data to the I/O interface 112. If it is required that the client device 140 needs to obtain authorization from the user to automatically send the input data, the user may set corresponding permission on the client device 140. The user may view, on the client device 140, a result output by the execution device 110. Specifically, the result may be presented in a form of displaying, a sound, an action, or the like. The client device 140 may also be used as a data collection end to collect the input data that is input into the I/O interface 112 and an output result that is output from the I/O interface 112 in the figure, use the input data and the output result as new sample data, and store the new sample data in the database 130. Certainly, the client device 140 may alternatively not perform collection, but the I/O interface 112 directly stores, in the database 130 as new sample data, the input data that is input into the I/O interface 112 and an output result that is output from the I/O interface 112 in the figure.

It should be noted that FIG. 3 is merely a schematic diagram of a system architecture according to an embodiment of this application. A location relationship between the devices, the components, the modules, and the like shown in the figure does not constitute any limitation. For example, in FIG. 3, the data storage system 150 is an external memory relative to the execution device 110, but in another case, the data storage system 150 may alternatively be disposed in the execution device 110.

For example, the recommendation model in this embodiment of this application may alternatively be a logistic regression model. The logistic regression model is a machine learning method used to resolve a classification problem, and may be used to estimate a possibility for a specific item.

For example, the recommendation model may be a deep factorization machine (DeepFM) model, or the recommendation model may be a wide and deep model.

The following describes a hardware structure of a chip provided in an embodiment of this application.

Figure 4:
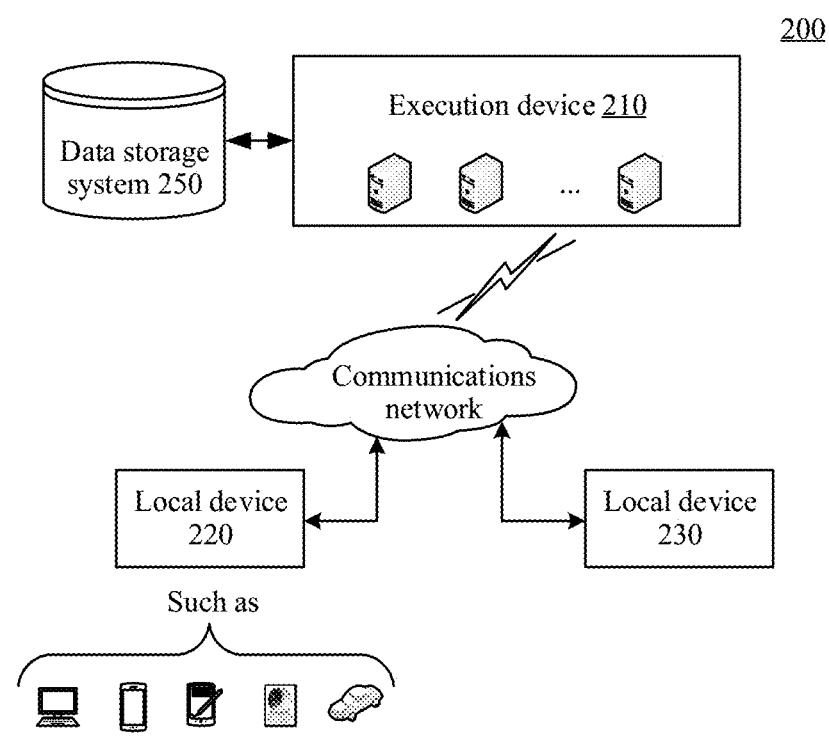
FIG. 4 is a schematic diagram of a system architecture according to an embodiment of this application.

FIG. 4 shows a system architecture 200 to which a recommendation model training method and a recommendation method in the embodiments of this application are applied according to an embodiment of this application. The system architecture 200 may include a local device 220, a local device 230, an execution device 210, and a data storage system 250. The local device 220 and the local device 230 are connected to the execution device 210 through a communications network.

The execution device 210 is implemented by one or more servers. In an embodiment, the execution device 210 cooperates with another computing device, for example, a device such as a data storage device, a router, or a load balancer. The execution device 110 may be disposed on one physical site, or distributed on a plurality of physical sites. The execution device 210 may implement the recommendation model training method and the recommendation method in the embodiments of this application by using data in the data storage system 250 or by invoking program code in the data storage system 250.

For example, the data storage system 250 may be deployed in the local device 220 or the local device 230. For example, the data storage system 250 may be configured to store a training sample.

It should be noted that the execution device 210 may also be referred to as a cloud device. In this case, the execution device 210 may be deployed on the cloud.

In an embodiment, the execution device 210 may perform the following process: obtaining at least one first training sample, where the first training sample includes attribute information of a first user and information about a first recommended object; processing the attribute information of the first user and the information about the first recommended object based on an interpolation model, to obtain an interpolation prediction label of the first training sample, where the interpolation prediction label is used to indicate prediction about whether the first user performs an operational action on the first recommended object when the first recommended object is recommended to the first user, a model parameter of the interpolation model is obtained by performing training based on at least one second training sample, the second training sample includes attribute information of a second user, information about a second recommended object, and a sample label of the second training sample, the sample label of the second training sample is used to indicate whether the second user performs an operational action on the second recommended object, and the second training sample is obtained when the second recommended object is randomly displayed to the second user; and performing training by using the attribute information of the first user and the information about the first recommended object in the first training sample as an input to a recommendation model and using the interpolation prediction label of the first training sample as a target output value of the recommendation model, to obtain a recommendation model.

The execution device 210 can obtain the recommendation model through training by performing the foregoing process. Based on the recommendation model, impact of training data bias on recommendation accuracy can be eliminated, and a probability that a target recommendation user performs an operational action on a candidate recommended object can be more accurately predicted.

In an embodiment, the training method performed by the execution device 210 may be a training method performed on the cloud.

Users may operate respective user equipment (for example, the local device 220 and the local device 230) to interact with the execution device 210. Each local device may be any computing device, such as a personal computer, a computer workstation, a smartphone, a tablet computer, an intelligent camera, a smart automobile, another type of cellular phone, a media consumption device, a wearable device, a set-top box, or a game console.

The local device of each user may interact with the execution device 210 through a communications network of any communications mechanism/communications standard. The communications network may be a wide area network, a local area network, a point-to-point connection, or any combination thereof.

In an embodiment, the local device 220 or the local device 230 may obtain a related parameter of the recommendation model from the execution device 210, the recommendation model is configured on the local device 220 or the local device 230, and the recommendation model is used to predict a probability that a target recommendation user performs an operational action on a candidate recommended object.

In another embodiment, the recommendation model may be directly deployed on the execution device 210. The execution device 310 obtains to-be-processed data from the local device 220 and the local device 230, and predicts, based on the recommendation model, a probability that a target recommendation user performs an operational action on a candidate recommended object.

For example, the data storage system 250 may be deployed in the local device 220 or the local device 230, and configured to store a training sample of the local device.

For example, the data storage system 250 may be independent of the local device 220 or the local device 230, and is independently deployed on a storage device. The storage device may interact with the local device, obtain a user behavior log in the local device, and store the user behavior log in the storage device.

Figure 5:
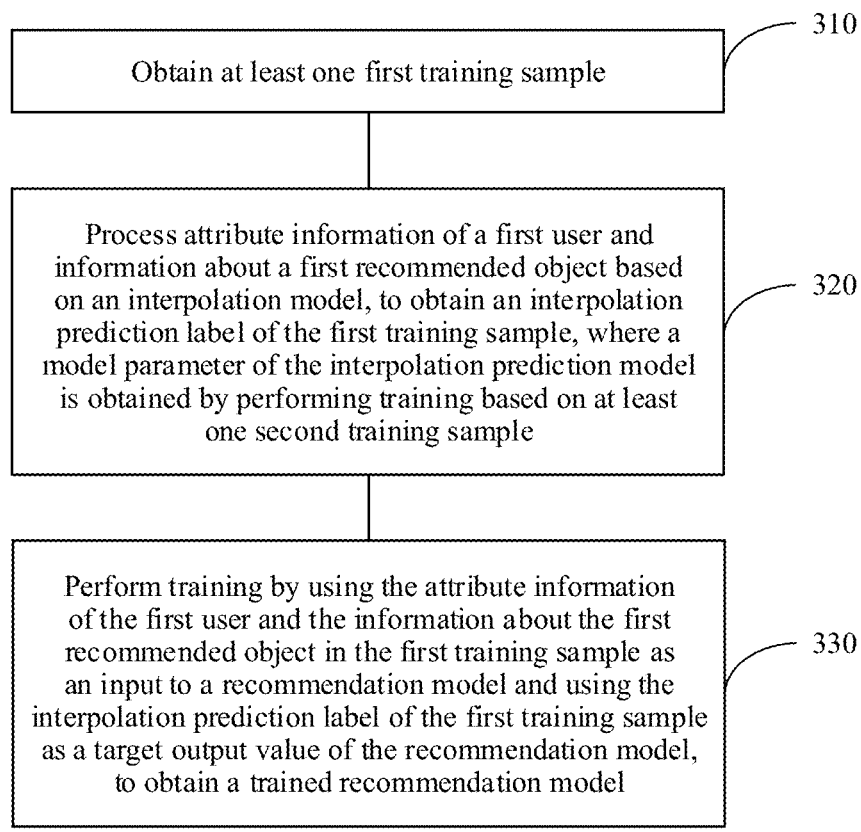
FIG. 5 is a schematic flowchart of a recommendation model training method according to an embodiment of this application.

FIG. 5 shows a recommendation model training method 300 according to an embodiment of this application. The method 300 includes operation 310 to operation 330. The training method 300 may be performed by the training device 120 in FIG. 3. The following describes operation 310 to operation 330 in detail.

Operation 310: Obtain at least one first training sample, where the first training sample includes attribute information of a first user and information about a first recommended object.

The first training sample may be data obtained from the data storage system 250 shown in FIG. 4.

For example, the attribute information of the first user and the information about the first recommended object may be obtained through context information of the first training sample.

User attribute information may include some personalized attributes of a user, for example, a gender of the user, an age of the user, an occupation of the user, an income of the user, a hobby of the user, and an educational level of the user.

The attribute information of the first user may include one or more items in the foregoing user attribute information.

A recommended object may be a recommended application in an application market on a terminal device in the foregoing application scenario 1. Alternatively, a recommended object may be a search term recommended by a system in the foregoing application scenario 2. In this embodiment of this application, a recommended object may be information that can be recommended by a recommendation system to a user. A specific implementation of the recommended object is not limited in this application.

The first recommended object may be one of the foregoing recommended objects.

Information about the recommended object may include an identifier of the recommended object, for example, an ID of the recommended object. The information about the recommended object may further include some attributes of the recommended object, for example, a name of the recommended object and a type of the recommended object.

For example, the recommended object may be a recommended application in an application market on a terminal device in the foregoing application scenario 1, and the information about the recommended object may be information about the recommended application. The information about the recommended application may include an identifier of the recommended application, for example, an ID of the recommended application. The information about the recommended application may further include some attributes of the recommended application, for example, a name of the recommended application, a developer of the recommended application, a type of the recommended application, a size of an installation package of the recommended application, a score of the recommended application, and a comment on the recommended application.

The information about the first recommended object may include one or more items in the foregoing information about the recommended object.

Operation 311: Obtain at least one third training sample, where the third training sample includes attribute information of a third user, information about a third recommended object, and a sample label of the third training sample, and the sample label of the third training sample is used to indicate whether the third user performs an operational action on the third recommended object.

It should be noted that operation 311 is an optional operation.

The third training sample may be data obtained from the data storage system 250 shown in FIG. 4.

For example, the attribute information of the third user and the information about the third recommended object may be obtained through context information of the third training sample.

The first user and the third user may be a same user, or may be different users.

The attribute information of the third user may include one or more items in the user attribute information described in operation 310.

The third recommended object may be one of the recommended objects described in operation 310.

The information about the third recommended object may include one or more items in the foregoing information about the recommended object.

It should be noted that a category of an attribute, of a recommended object, included in the information about the first recommended object may be the same as or different from a category of an attribute, of a recommended object, included in the information about the third recommended object. For example, the information about the first recommended object may include a name of the first recommended object and a type of the first recommended object. The information about the third recommended object may include a name of the third recommended object.

A label may be used to mark a training sample as a positive sample or a negative sample. For example, the label may be 0 or 1, a label of the positive sample may be 1, and a label of the negative sample may be 0. For another example, the label may alternatively be a specific value. To be specific, a probability that the training sample is the positive sample or the negative sample is marked by using the specific value.

A sample label may be obtained based on whether a user performs an operational action on a recommended object.

Operational actions performed by the user on the recommended object may include clicking behavior of the user, downloading behavior of the user, purchasing behavior of the user, browsing behavior of the user, and negative comment behavior of the user.

That the sample label is obtained based on whether the user performs an operational action on the recommended object may include the following several cases.

Case 1: If the user performs an operational action on the recommended object, the sample label may be 1. If the user performs no operational action on the recommended object, the sample label may be 0.

For example, in an application market, the operational action may be downloading behavior. Specifically, when a user in a training sample A1 downloads a recommended object in the training sample A1, the training sample A1 is a positive sample, and a sample label of the training sample A1 may be 1; or when a user in a training sample A1 downloads no recommended object in the training sample A1, the training sample A1 is a negative sample, and a sample label of the training sample A1 may be 0. The training sample A1 is an example of the third training sample.

Case 2: If the user performs an operational action on the recommended object, the sample label may be 0. If the user performs no operational action on the recommended object, the sample label may be 1.

For example, in an application market, the operational action may be negative comment behavior. Specifically, when a user in a training sample A1 submits a negative comment on a recommended object in the training sample A1, the training sample A1 is a negative sample, and a sample label of the training sample A1 may be 0; or when a user in a training sample A1 submits no negative comment on a recommended object in the training sample A1, the training sample A1 is a positive sample, and a sample label of the training sample A1 may be 1. The training sample A1 is an example of the third training sample.

Case 3: If the user performs a first type of operational action on the recommended object, the sample label may be 1. If the user performs a second type of operational action on the recommended object, the sample label may be 0.

For example, in an application scenario of paid music recommendation, the first type of operational action may include purchasing behavior or the like, and the second type of operational action may include browsing behavior or the like. Specifically, when a user in a training sample A1 browses a recommended object in the training sample A1, the training sample A1 is a negative sample, and a sample label of the training sample A1 may be 0; or when a user in a training sample A1 purchases a recommended object in the training sample A1, the training sample A1 is a positive sample, and a sample label of the training sample A1 may be 1. The training sample A1 is an example of the third training sample. It should be understood that in this embodiment of this application, only the purchasing behavior and the browsing behavior are used as examples to describe a process of determining the sample label, but this should not be considered as a limitation on this embodiment of this application. In actual application, the sample label corresponding to the operational action may be determined based on a specific application scenario. For example, in some scenarios, the first type of operational action may include browsing behavior or the like, and the second type of operational action may include negative comment behavior or the like.

In an embodiment, the first training sample may be obtained when the first recommended object is not displayed to the first user, and the third training sample may be obtained when the third recommended object is displayed to the third user.

After the recommended object is displayed to the user, feedback information about whether the user performs an operational action on the recommended object may be obtained. For example, the feedback information may be obtained from a user behavior log.

The first training sample may be obtained when the first recommended object is not displayed to the first user. To be specific, the first training sample has no feedback information about whether the first user performs an operational action on the first recommended object, and the first training sample has no actual sample label.

The following provides an example of the third training sample. A training sample may be obtained from a recommendation request and a recommended object corresponding to the recommendation request. The training sample includes attribute information of a user in the recommendation request and information about the recommended object.

For example, in an application scenario of an application market, a recommendation system recommends an application to the user. A training sample A1 (where the training sample A1 is an example of the third training sample) may include data of four categories of attributes: a gender of a user and an occupation of the user in the training sample A1, and an ID of a recommended application and a type of the recommended application in the training sample A1, that is, data of four fields (field). This may also be understood as that the training sample A1 includes four training features. A field represents a category of an attribute. For example, Chengdu, Chongqing, and Beijing belong to a same field, and the field is "city". The four categories of attributes are numbered from 0 to 3.

That the training sample A1 is a positive sample is used as an example. The training sample A1 may be represented as $x^I$=[1, 0:male, 1:teacher, 2:WeChat, 3:social], and 1 in the first place indicates that a sample label of the training sample A1 is 1. The sample label may indicate whether the user downloads the recommended application. When the sample label is 1, it may indicate that the user downloads WeChat. This is an original training sample. In a preprocessing process, a training feature may further be numbered. For example, "male" is numbered 0, "teacher" is numbered 1, "WeChat" is numbered 2, and "social" is numbered 3. In this case, the original training sample may be converted into $x^I$=[1, 0:0, 1:1, 2:2, 3:3].

For another example, in an application scenario of music recommendation, a recommendation system recommends music to the user. The recommended music may be music that needs to be paid for. A training sample A2 (where the training sample A2 is an example of the third training sample) may include data of five categories of attributes: a gender of a user and an age of the user in the training sample A2, and an ID of recommended music, a type of the recommended music, and a score of the recommended music in the training sample A2, that is, five fields. The five categories of attributes are numbered from 0 to 4.

That the training sample A2 is a positive sample is used as an example. The training sample A2 may be represented as =[1, 0:male, 1:20 years old, 2:music 1, 3:rock and roll, 4:4 points], and 1 in the first place indicates that a sample label of the training sample A2 is 1. The sample label may indicate whether the user purchases the recommended music. When the sample label is 1, it may indicate that the user purchases the music 1. This is an original training sample. In a preprocessing process, a training feature may further be numbered. For example, "male" is numbered 0, "20 years old" is numbered 1, "music 1" is numbered 2, "rock and roll" is numbered 3, and "4 points" is numbered 4. In this case, the original training sample may be converted into $x^I$=[1,0:0, 1:1,2:2,3:3,4:4].

The following describes the first training sample and the third training sample by using an example in which a recommended object is a recommended application in an application market.

The first training sample may be obtained when the first recommended object is not displayed to the first user, and the third training sample may be obtained when the third recommended object is displayed to the third user. In this case, the first recommended object may be a recommended application that is not launched (or not displayed to the first user). The third recommended object may be a recommended application that is launched (or displayed to the third user). For example, for a recommendation request, one or more of candidate recommended applications are displayed to a user corresponding to the recommendation request, so that feedback information about whether the user performs an operational action on the recommended applications may be obtained. A recommended application A displayed to the user A corresponding to the recommendation request is the third recommended object, and a training sample having feedback information about whether the user A performs an operational action on the recommended application A is the third training sample. To be specific, the third training sample includes attribute information of the user A, information about the recommended application A, and the sample label of the third training sample. A recommended application B in the candidate recommended applications that is not displayed to the user A cannot be used to obtain feedback information about whether the user A performs an operational action on the recommended application B. The recommended application B not displayed to the user A corresponding to the recommendation request is the first recommended object, and a training sample having no feedback information about whether the user A performs an operational action on the recommended application B is the first training sample. The first training sample includes the attribute information of the user A and information about the recommended application B. It should be understood that only an example in which the first training sample and the third training sample correspond to the same recommendation request is used for description above, and that both the first user and the third user are the user A is merely an example. For a recommendation request, a quantity of candidate recommended applications is m, a quantity of recommended applications displayed to a user corresponding to the recommendation request is n, and a quantity of recommended applications not displayed to the user corresponding to the recommendation request is m−n. Correspondingly, the n recommended applications may correspond to n third training samples. In other words, the n third training samples may be constructed by using the recommendation request and the n recommended applications. The m−n recommended applications may correspond to m−n first training samples. In other words, the m−n first training samples may be constructed by using the recommendation request and the m−n recommended applications.

Operation 320: Process the attribute information of the first user and the information about the first recommended object based on an interpolation model, to obtain an interpolation prediction label of the first training sample, where the interpolation prediction label is used to indicate prediction about whether the first user performs an operational action on the first recommended object when the first recommended object is recommended to the first user.

A model parameter of the interpolation model is obtained by performing training based on at least one second training sample, the second training sample includes attribute information of a second user, information about a second recommended object, and a sample label of the second training sample, the sample label of the second training sample is used to indicate whether the second user performs an operational action on the second recommended object, and the second training sample is obtained when the second recommended object is randomly displayed to the second user.

The interpolation model may be used to predict whether the first user performs an operational action on the first recommended object when the first recommended object is recommended to the first user. The interpolation prediction label may be 0 or 1. In other words, 0 or 1 is used to indicate whether the first user performs an operational action on the first recommended object. The interpolation prediction label may alternatively be a probability value. In other words, the probability value is used to represent a probability that the first user performs an operational action on the first recommended object.

For example, the interpolation model may be an advertisement average CTR model, a logistic regression (logistic regression, LR) model, a field-aware factorization machine (field-aware factorization machines, FFM), a DNN, or the like.

The second training sample may be data obtained from the data storage system 250 shown in FIG. 4.

For example, the attribute information of the second user and the information about the second recommended object may be obtained through context information of the second training sample.

The first user and the second user may be a same user, or may be different users.

The attribute information of the second user may include one or more items in the user attribute information described in operation 310.

The second recommended object may be one of the recommended objects described in operation 310.

The information about the second recommended object may include one or more items in the foregoing information about the recommended object.

It should be noted that a category of an attribute, of a recommended object, included in the information about the first recommended object may be the same as or different from a category of an attribute, of a recommended object, included in the information about the second recommended object. For example, the information about the first recommended object may include a name of the first recommended object and a type of the first recommended object. The information about the second recommended object may include a name of the second recommended object.

A description of the sample label of the second sample may be similar to that in operation 311, and details are not described herein.

As described above, the second training sample may be obtained when the second recommended object is displayed to the second user. To be specific, the second training sample has feedback information about whether the second user performs an operational action on the second recommended object, and the second training sample has the actual sample label.

The second training sample may be the same as or different from the third training sample in operation 311.

The second training sample is a training sample without bias. The third training sample may be a training sample without bias, or may be a training sample with bias.

A training sample with bias may be understood as a training sample obtained when a recommended object is displayed to a user according to a specific rule. For example, when a recommendation request is received, candidate recommended objects are ranked based on expected revenues, and a recommended object to be displayed to the user is determined based on a sequence. To be specific, in this case, each recommended object has a different probability of being displayed to the user, and a probability of displaying a recommended object with higher expected revenues to the user is higher. In this case, an obtained training sample is a training sample with bias.

The following describes the training sample without bias and the training sample with bias by using an example in which a recommended object is a recommended application in an application market.

For a recommendation request, a recommended application is displayed according to a random launch policy. To be specific, a recommended application in a plurality of candidate recommended applications is randomly displayed to a user corresponding to the recommendation request, and all recommended applications have a same probability of being displayed to the user corresponding to the recommendation request. In this case, an obtained training sample is a training sample without bias. For a recommendation request, recommended applications in candidate recommended applications are ranked based on expected revenues, and a recommended application to be displayed to a user is determined based on a sequence. In this case, an obtained training sample is a training sample with bias.

Training the interpolation model by using the second training sample, that is, training the interpolation model by using a training sample without bias, can avoid impact of a bias problem on interpolation model training, and improve interpolation model accuracy, so that the obtained interpolation prediction label is more accurate.

In an embodiment, the interpolation model may be selected based on a quantity of second training samples.

For example, when there are a relatively large quantity of second training samples, the second training samples are relatively representative, and the interpolation model may be trained by using a relatively complex model or by using more training features, so that the interpolation model can more accurately fit unbiased data distribution. The relatively complex model may be a logistic regression model, a field-aware factorization machine, a deep neural network, or the like. When there are a relatively small quantity of second training samples, the second training samples are relatively unrepresentative, and the interpolation model may be trained by using a relatively simple model or by using fewer training features, to avoid that the interpolation model overfits unbiased data distribution. For example, the relatively simple model may be an advertisement average click-through rate model.

For example, in an application scenario of an application market, when the quantity of second training samples is greater than 100,000, the interpolation model may be a field-aware factorization machine, a deep neural network, or the like. When the quantity of second training samples is between 10,000 and 100,000, the interpolation model may be a logistic regression model. When the quantity of second training samples is less than 10,000, the interpolation model may be an advertisement average click-through rate model.

According to the solutions in this embodiment of this application, in a training process, the interpolation model may be selected based on the quantity of second training samples. Different thresholds may be set for different application scenarios to select the interpolation model, and the interpolation model may be flexibly adjusted. Only a small quantity of second training samples are required to alleviate impact caused by a bias problem and improve recommendation model accuracy. This avoids a case in which overall system revenues decrease because a large quantity of recommended objects are randomly displayed for large-scale collection of second training samples.

A training feature may be a feature obtained from attribute information of a user and information about a recommended object.

330: Perform training by using the attribute information of the first user and the information about the first recommended object in the first training sample as an input to a recommendation model and using the interpolation prediction label of the first training sample as a target output value of the recommendation model, to obtain a recommendation model.

When the method 300 includes operation 311, operation 330 may be: Perform training based on the first training sample and the third training sample, to obtain a recommendation model.

In an embodiment, the performing training based on the first training sample and the third training sample may be: performing training based on a target training model by using the attribute information of the first user, the information about the first recommended object, the attribute information of the third user, and the information about the third recommended object as the input to the recommendation model and using the interpolation prediction label of the first training sample and the sample label of the third training sample as the target output value of the recommendation model, to obtain the trained recommendation model.

It should be understood that in the foregoing training process, training is performed based on the target training model by using the attribute information of the first user and the information about the first recommended object as an input to the recommendation model, using the interpolation prediction label of the first training sample as a target output value corresponding to the input, using the attribute information of the third user and the information about the third recommended object as an input to the recommendation model, and using the sample label of the third training sample as a target output value corresponding to the input.

In an embodiment, the target training model includes a first loss function and a second loss function, the first loss function is used to indicate a difference between the interpolation prediction label of the first training sample and a prediction label of the first training sample, and the second loss function is used to indicate a difference between the sample label of the third training sample and a prediction label of the third training sample.

For example, training the recommendation model based on the target training model may be: continuously decreasing the first loss function and the second loss function by performing iteration a plurality of times according to a back propagation algorithm, to obtain a model parameter of the recommendation model.

Specifically, there may be an addition relationship between the first loss function and the second loss function. Alternatively, there may be a multiplication relationship between the first loss function and the second loss function.

In an embodiment, the target training model may be:

$$\min_{W} \lambda R(W) + \sum_{l=1}^{L} \ell(y_l, \hat{y}_l) + \omega \sum_{l=L+1}^{\hat{L}} \ell(\sigma_l, \hat{y}_l).$$

Herein, W is a parameter of the recommendation model, R(W) is a regular term, λ represents a hyperparameter that determines a weight of the regular term, a training sample $x^1$ to a training sample $x^L$ in a training sample set $\{x^1, x^2, \ldots x^L, x^{L+1}, x^{L+2}, \ldots x^{\hat{L}}\}$ are the third training sample, a training sample $x^{L+1}$ to a training sample $x^{\hat{L}}$ are the first training sample, $\hat{L}$ represents a quantity of training samples in the training sample set, L represents a quantity of third training samples in the training sample set, $\sigma_l$ represents an interpolation prediction label $\sigma(x^l)$ of a training sample $x^l$, $y_l$ represents a sample label of the training sample $x^l$, $\hat{y}_l$ represents a prediction label of the training sample $x^l$, $\ell(y_l,\hat{y}_l)$ represents the second loss function, $\ell(\sigma_l,\hat{y}_l)$ represents the first loss function, and ω is a hyperparameter and is used to adjust weights of the first loss function and the second loss function.

It should be understood that the training sample $x^1$ to the training sample $x^L$ are L different third training samples, and the training sample $x^{L+1}$ to the training sample $x^{\hat{L}}$ are $\hat{L}$–L different first training samples.

For example, in operation 320, the third training sample may be further processed based on the interpolation model, to obtain an interpolation prediction label of the third training sample. Then, the recommendation model is trained based on the target training model by using the third training sample and the first training sample as input samples for the recommendation model and using the sample label of the third training sample, the interpolation prediction label of the third training sample, and the interpolation prediction label of the first training sample as the target output value of the recommendation model.

The target training model may be:

$$\min_{W} \lambda R(W) + \sum_{l=1}^{L} (\ell(y_l, \hat{y}_l) + \omega \ell(\sigma_l, \hat{y}_l)) + \omega \sum_{l=1}^{\hat{L}} \ell(\sigma_l, \hat{y}_l).$$

It should be understood that the foregoing two target training models are a same target training model, and differ in only implementations.

It should be noted that, in the foregoing two target training models, multiplication between the hyperparameter and the second loss function is merely an example. In other words, in the target training model, the hyperparameter may alternatively be set in front of the first loss function, that is, the hyperparameter may be multiplied by the first loss function.

Alternatively, two hyperparameters may be set in the target training model, and the two hyperparameters are set in front of the first loss function and the second loss function respectively. A method for performing training based on the target training model may be referred to as a propensity-free doubly robust (propensity-free doubly robust) method.

Weights of the first loss function and the second loss function in the target training model can be adjusted by setting different hyperparameters, to further improve recommendation model accuracy. When accuracy of the interpolation model is relatively high, the weight of the second loss function may be higher than the weight of the first loss function. In other words, a value of $\omega$ may be greater than 1. For example, when there are a relatively large quantity of second training samples used to train the interpolation model, the second training samples are relatively representative, so that the interpolation model can more accurately fit distribution of the second training samples, and accuracy of the obtained interpolation model is relatively high. In this case, the weight of the second loss function may be higher than the weight of the first loss function. In other words, the value of $\omega$ may be greater than 1. In this way, training the recommendation model based on the target training model can improve recommendation model accuracy.

In an embodiment, the recommendation model may be a low-rank model. For example, the recommendation model may be a matrix factorization (matrix factorization, MF) model, a factorization machine (factorization machine, FM), an FFM, or the like.

In this way, in a solving process, a training sample may be divided into two parts: attribute information of a user in a recommendation request and information about a recommended object. This helps reduce time complexity of calculating the training sample.

It should be noted that a training feature used for the interpolation model may be different from a training feature used for the recommendation model. The training feature may be determined from attribute information of a user and information about a recommended object. For example, the attribute information of the user may include a gender of the user and an occupation of the user, and the information about the recommended object may include a type of the recommended object, a score of the recommended object, and a comment on the recommended object. The training feature used for the interpolation model may include the type of the recommended object and the gender of the user. The training feature used for the recommendation model may include the type of the recommended object, the score of the recommended object, the comment on the recommended object, the gender of the user, and the occupation of the user.

According to the solutions in this embodiment of this application, the second training sample is a training sample without bias, and the interpolation model is trained by using the second training sample, so that impact of a bias problem on interpolation model training can be avoided, and interpolation model accuracy can be improved. In this way, the obtained interpolation prediction label is more accurate. Further, the recommendation model is trained by using the more accurate interpolation prediction label, so that recommendation model accuracy can be improved.

In addition, the first training sample and the third training sample are used together to train the recommendation model, so that both a function of the interpolation prediction label obtained through the interpolation model and a function of an actual sample label in the training process are considered. This avoids a case in which the recommendation model accuracy depends on only accuracy of the interpolation prediction label, and further improves the recommendation model accuracy.

When the first recommended object is not displayed to the first user, the interpolation prediction label is added to the first training sample, so that a fact that does not occur can be incorporated into modeling, and used together with a fact that occurs, to train the recommendation model. In other words, the first training sample without a sample label and the third training sample with the sample label are used together to train the recommendation model. Therefore, sample distribution can be more proper, and recommendation model accuracy can be improved.

When the first recommended object is not displayed to the user, a sample label corresponding to the first training sample cannot be obtained based on an operational action of the user, and the recommendation model cannot be trained by using the first training sample. Incorporating the first training sample into modeling is to train the recommendation model according to a counterfactual learning method. Counterfactual learning is a method in which a fact that did not occur is represented and incorporated into a modeling process. In this embodiment of this application, the first training sample may be understood as a fact that did not occur. A recommended object not displayed to the user is incorporated into a training sample according to the counterfactual learning method, so that sample distribution is more proper. Then, the recommendation model is trained. In this way, impact caused by a bias problem is alleviated, and recommendation model accuracy is improved.

Figure 6:
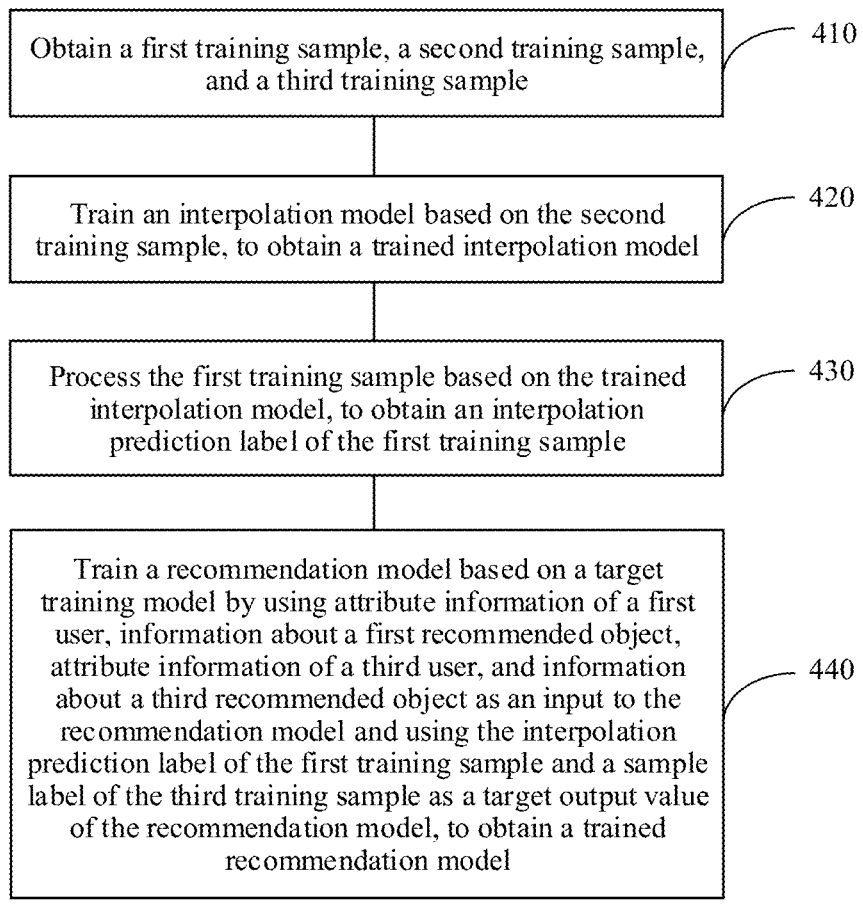
FIG. 6 is a schematic flowchart of a recommendation model training method according to another embodiment of this application.

FIG. 6 shows a recommendation model training method 400 according to an embodiment of this application. The method 400 includes operation 410 to operation 440. The following describes operation 410 to operation 440 in detail. It should be understood that, for a specific implementation of operation 410 to operation 440, refer to the foregoing method 300. To avoid unnecessary repetition, repeated descriptions are properly omitted below when the method 400 is described.

Operation 410: Obtain a first training sample, a second training sample, and a third training sample.

There may be a plurality of first training samples, a plurality of second training samples, and a plurality of third training samples.

The first training sample includes attribute information of a first user and information about a first recommended object. The second training sample includes attribute information of a second user, information about a second recommended object, and a sample label of the second training sample, the sample label of the second training sample is used to indicate whether the second user performs an operational action on the second recommended object, and the second training sample is obtained when the second recommended object is randomly displayed to the second user. The third training sample includes attribute information of a third user, information about a third recommended object, and a sample label of the third training sample, and the sample label of the third training sample is used to indicate whether the third user performs an operational action on the third recommended object.

The first training sample may be obtained when the first recommended object is not displayed to the first user, and the third training sample may be obtained when the third recommended object is displayed to the third user.

The plurality of second training samples may be some of the plurality of third training samples. To be specific, the plurality of third training samples may include a training sample without bias and a training sample with bias.

Operation 420: Train an interpolation model based on the second training sample, to obtain an interpolation model.

Operation 430: Process the first training sample based on the interpolation model, to obtain an interpolation prediction label of the first training sample.

440: Train a recommendation model based on a target training model by using the attribute information of the first user and the information about the first recommended object in the first training sample and the attribute information of the third user and the information about the third recommended object in the third training sample as an input to the recommendation model and using the interpolation prediction label of the first training sample and the sample label of the third training sample as a target output value of the recommendation model, to obtain a trained recommendation model.

The target training model may be:

$$\min_{W} \lambda R(W) + \sum_{l=1}^{L}(\ell(y_l, \hat{y}_l) + \omega\ell(\sigma_l, \hat{y}_l)) + \omega\sum_{l=1}^{\hat{L}}\ell(\sigma_l, \hat{y}_l).$$

Herein, W is a parameter of the recommendation model, R(W) is a regular term, λ represents a hyperparameter that determines a weight of the regular term, a training sample $x^1$ to a training sample $x^L$ in a training sample set $\{x^1, x^2, \ldots x^L, x^{L-1}, x^{L+2}, \ldots x^{\hat{L}}\}$ are the third training sample, a training sample $x^{L+1}$ to a training sample $x^{\hat{L}}$ are the first training sample, $\hat{L}$ represents a quantity of training samples in the training sample set, L represents a quantity of third training samples in the training sample set, $\sigma_l$ represents an interpolation prediction label $\sigma(x^l)$ of a training sample $x^l$, $y_l$ represents a sample label of the training sample $x^l$, $\hat{y}_l$ represents a prediction label of the training sample $x^l$, $\ell(y_l, \hat{y}_l)$ represents the second loss function, $\ell(\sigma_l, \hat{y}_l)$ represents the first loss function, and ω is a hyperparameter and is used to adjust weights of the first loss function and the second loss function.

According to the solutions in this embodiment of this application, training the interpolation model by using the second training sample, that is, training the interpolation model by using a training sample without bias, can avoid impact of a bias problem on interpolation model training, and improve interpolation model accuracy, so that the obtained interpolation prediction label is more accurate. In addition, when the first recommended object is not displayed to the user, a sample label of the first training sample cannot be obtained. The corresponding interpolation prediction label is added to the first training sample based on the interpolation model. A recommended object not displayed to the user is incorporated into a training sample, that is, a fact that does not occur is incorporated into modeling according to a counterfactual learning method, to train the recommendation model. In this way, sample distribution is more proper. The recommendation model is trained according to a propensity-free doubly robust method, and only a small quantity of second training samples are required to alleviate impact caused by a bias problem and improve recommendation model accuracy. This avoids a case in which overall system revenues decrease because a large quantity of recommended objects are randomly displayed for large-scale collection of second training samples.

A recommendation model obtained through training according to an existing method and the recommendation model proposed in this application are tested based on two indicators: a negative logarithmic loss (NLL) and an area under the receiver operating characteristic (ROC) curve (AUC). Accuracy of the recommendation model in this embodiment of this application is improved by more than 10% compared with that of the existing recommendation model obtained through binary classification modeling.

Other than the training solutions described in FIG. 6, during implementation of a training manner in this application, alternatively, a first training sample and a second training sample may be obtained. The first training sample is obtained by performing label prediction based on an interpolation model, and the interpolation prediction model is generated through pre-training. A training manner thereof is the same as the training manner in the foregoing embodiment, and details are not described herein again. A recommendation model is obtained through training based on the first training sample and a third training sample.

Figure 7:
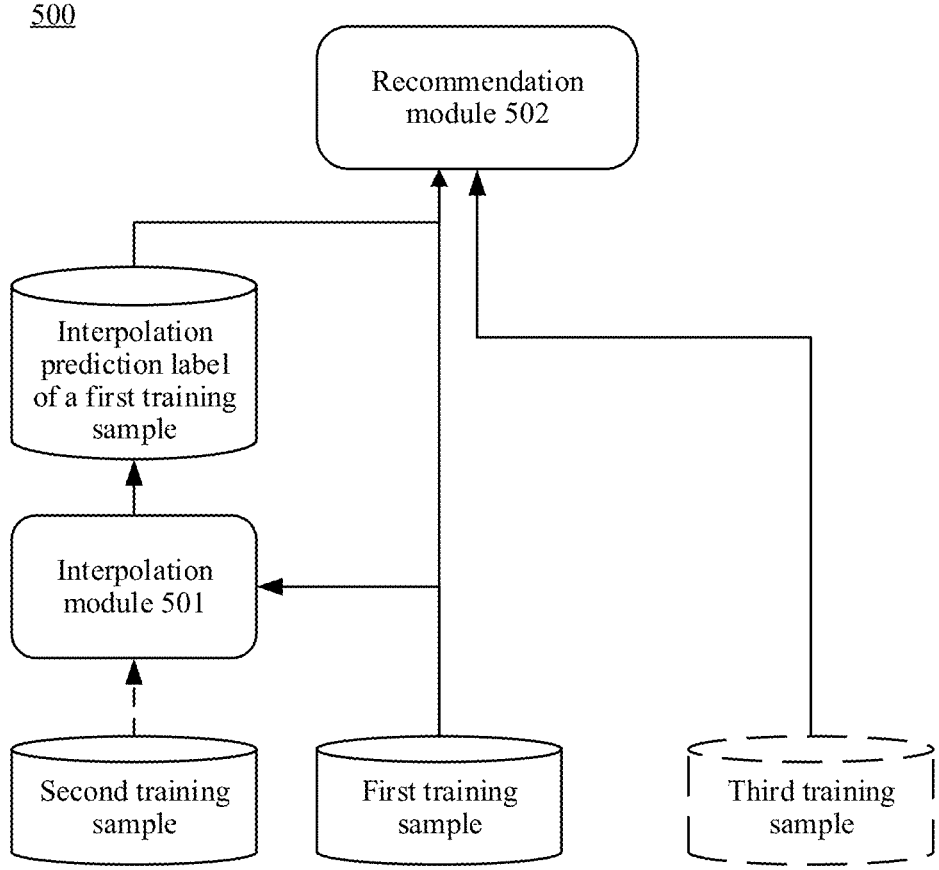
FIG. 7 is a schematic diagram of a recommendation framework according to an embodiment of this application.

FIG. 7 is a schematic diagram of a recommendation framework 500 according to an embodiment of this application. The recommendation framework 500 includes an interpolation module 501 and a recommendation module 502. The interpolation module may be configured to process a training sample without a sample label to obtain an interpolation prediction label. The training sample without a sample label is incorporated into modeling, so that sample distribution is more proper, and impact of a bias problem on accuracy of a recommendation result is eliminated. In this way, the more accurate recommendation module 502 is obtained.

It should be noted that the interpolation module 501 may correspond to the interpolation model in FIG. 5 or FIG. 6, and the recommendation module 502 may correspond to the recommendation model in FIG. 5 or FIG. 6.

The interpolation module 501 may be configured to add an interpolation prediction label to a training sample without a sample label.

The recommendation module 502 may be configured to predict a probability that a user in the training sample performs an operational action on a recommended object in the training sample.

For example, the recommendation framework 500 may be divided into two phases: a training phase and a recommendation phase. The following separately describes the training phase and the recommendation phase.

The training phase is as follows:

Operation A-1: Obtain at least one piece of first training data and at least one second training sample. The first training sample includes attribute information of a first user and information about a first recommended object.

Operation A-2: Process the attribute information of the first user and the information about the first recommended object based on the interpolation module 601, to obtain an interpolation prediction label of the first training sample, where the interpolation prediction label is used to indicate prediction about whether the first user performs an operational action on the first recommended object when the first recommended object is recommended to the first user.

A parameter of the interpolation module 601 is obtained by performing training based on the second training sample, the second training sample includes attribute information of a second user, information about a second recommended object, and a sample label of the second training sample, the sample label of the second training sample is used to indicate whether the second user performs an operational action on the second recommended object, and the second training sample is obtained when the second recommended object is randomly displayed to the second user.

Operation A-3: Obtain at least one third training sample. This operation is an optional operation.

The third training sample includes attribute information of a third user, information about a third recommended object, and a sample label of the third training sample, and the sample label of the third training sample is used to indicate whether the third user performs an operational action on the third recommended object.

Operation A-4: Perform training by using the attribute information of the first user and the information about the first recommended object in the first training sample as an input to a recommendation model and using the interpolation prediction label of the first training sample as a target output value of the recommendation model, to obtain the recommendation module 502.

When operation A-3 is included, operation A-4 may be: Perform training based on the first training sample, the third training sample, and a target training model, to obtain the recommendation module 502.

The target recommendation model may be the target recommendation model in operation 330 or operation 440. Details are not described herein again.

For example, the interpolation module may be an advertisement average CTR model, a logistic regression model, an FFM, a DNN, or the like.

For example, the recommendation module may be an MF, an FM, an FFM, or the like.

According to the solutions in this embodiment of this application, an interpolation prediction label of a second type of training sample is obtained based on the interpolation model, and then the second type of training sample and the corresponding interpolation prediction label may be used as a part of training data to train the recommendation model. The second type of training sample without a sample label is incorporated into modeling, so that sample distribution can be more proper, and recommendation model accuracy can be improved.

The recommendation phase is as follows:

In the recommendation phase, only the recommendation module 502 needs to be deployed. A recommendation system constructs an input vector based on attribute information of a user and information about a recommended object, and predicts, by using the recommendation module 502, a probability that the user performs an operational action on the recommended object.

Figure 8:
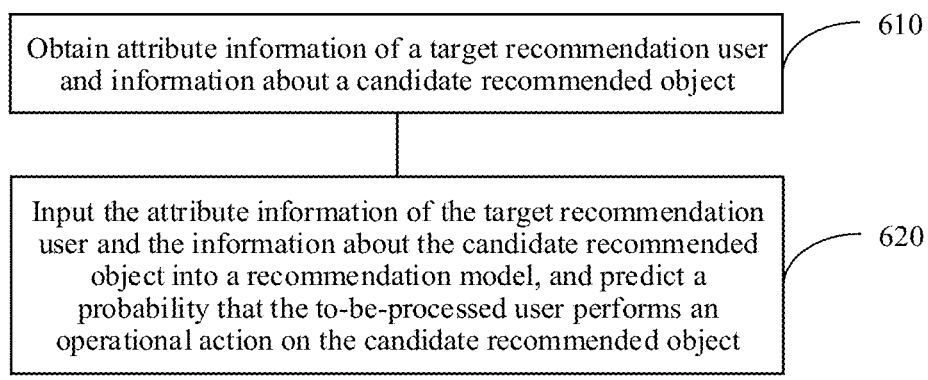
FIG. 8 is a schematic flowchart of a recommendation method according to an embodiment of this application.

FIG. 8 is a schematic diagram of a recommendation method 600 according to an embodiment of this application. The method 600 includes operation 610 and operation 620. The following describes operation 610 and operation 620 in detail.

Operation 610: Obtain attribute information of a target recommendation user and information about a candidate recommended object.

For example, when receiving a to-be-processed recommendation request, a recommendation system may determine the attribute information of the target recommendation user based on the to-be-processed recommendation request.

For example, the attribute information of the target recommendation user may include some personalized attributes of the user, for example, a gender of the target recommendation user, an age of the target recommendation user, an occupation of the target recommendation user, an income of the target recommendation user, a hobby of the target recommendation user, and an educational level of the target recommendation user.

For example, the information about the candidate recommended object may include an identifier of the candidate recommended object, for example, an ID of the candidate recommended object. The information about the candidate recommended object may further include some attributes of the candidate recommended object, for example, a name of the candidate recommended object and a type of the candidate recommended object.

Operation 620: Input the attribute information of the target recommendation user and the information about the candidate recommended object into a recommendation model, and predict a probability that the target recommendation user performs an operational action on the candidate recommended object.

For example, the candidate recommended object may be a recommended object in a candidate recommended object set. Candidate recommended objects in the candidate recommendation set may be ranked based on predicted probabilities that the target recommendation user performs an operational action on the candidate recommended objects, to obtain a recommendation result of the candidate recommended objects. For example, a candidate recommended object with a highest probability is selected and displayed to the user. For example, the candidate recommended object may be a candidate recommended application.

Figure 9:
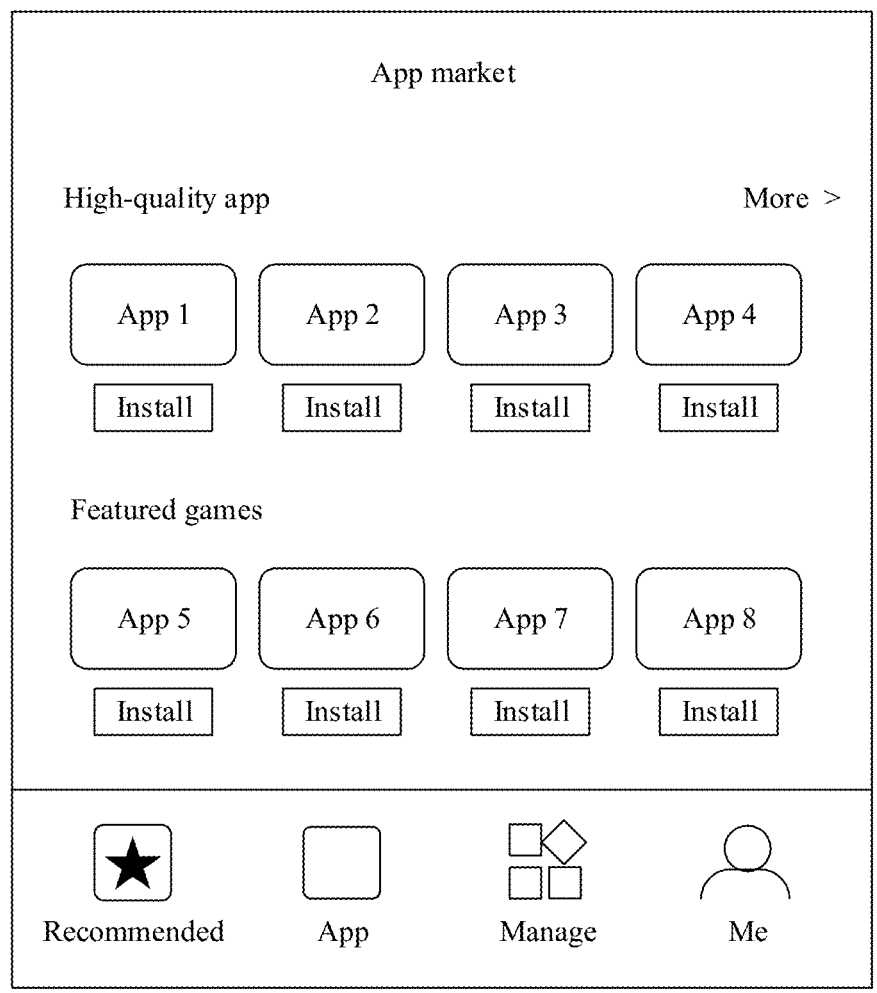
FIG. 9 is a schematic diagram of recommended objects in an application market according to an embodiment of this application.

FIG. 9 shows a "recommendation" page in an application market. There may be a plurality of ranking lists on the page. For example, the ranking lists may include a ranking list of high-quality applications and a ranking list of featured games. The featured games are used as an example. A recommendation system of the application market predicts, based on attribute information of a user and information about candidate recommended applications, probabilities that the user downloads (installs) the candidate recommended applications, ranks the candidate recommended applications in descending order of the probabilities, and places, in the first place, an application that is most likely to be downloaded.

For example, a recommendation result of the high-quality applications may be that an app 5 is located at a recommendation location 1 in the featured games, an app 6 is located at a recommendation location 2 in the featured games, an app 7 is located at a recommendation location 3 in the featured games, and an app 8 is located at a recommendation location 4 in the featured games. After the user sees the recommendation result in the application market, the user may perform an operational action on the recommendation result based on interests of the user. After being performed, the operational action of the user is stored in a user behavior log.

For example, in the application market shown in FIG. 9, a recommendation model may be trained by using the user behavior log as training data.

It should be understood that the foregoing example descriptions are intended to help a person skilled in the art understand the embodiments of this application, but are not intended to limit the embodiments of this application to a specific value or a specific scenario in the examples. A person skilled in the art definitely can make various equivalent modifications or changes according to the examples described above, and such modifications or changes also fall within the scope of the embodiments of this application.

The recommendation model may be the recommendation module 501 in FIG. 7. A training method for the recommendation model may be the training method shown in FIG. 5 or FIG. 6 or the method in the training phase in FIG. 7. Details are not described herein again.

A model parameter of the recommendation model is obtained by performing training by using attribute information of a first user and information about a first recommended object in a first training sample as an input to the recommendation model and using an interpolation prediction label of the first training sample as a target output value of the recommendation model. The interpolation prediction label of the first training sample is obtained by processing the attribute information of the first user and the information about the first recommended object based on an interpolation model, the interpolation prediction label is used to indicate prediction about whether the first user performs an operational action on the first recommended object when the first recommended object is recommended to the first user, a model parameter of the interpolation model is obtained by performing training based on at least one second training sample, the second training sample includes attribute information of a second user, information about a second recommended object, and a sample label of the second training sample, the sample label of the second training sample is used to indicate whether the second user performs an operational action on the second recommended object, and the second training sample is obtained when the second recommended object is randomly displayed to the second user.

In an embodiment, that a model parameter of the recommendation model is obtained by performing training by using attribute information of a first user and information about a first recommended object in a first training sample as an input to the recommendation model and using an interpolation prediction label of the first training sample as a target output value of the recommendation model includes: The model parameter of the recommendation model is obtained based on a target training model by using the attribute information of the first user, the information about the first recommended object, and attribute information of a third user and information about a third recommended object in a third training sample as the input to the recommendation model and using the interpolation prediction label of the first training sample and a sample label of the third training sample as the target output value of the recommendation model. The sample label of the third training sample is used to indicate whether the third user performs an operational action on the third recommended object.

In an embodiment, the first training sample may be obtained when the first recommended object is not displayed to the first user, and the third training sample may be obtained when the third recommended object is displayed to the third user.

In an embodiment, the target training model includes a first loss function and a second loss function, the first loss function is used to indicate a difference between the interpolation prediction label of the first training sample and a prediction label of the first training sample, and the second loss function is used to indicate a difference between the sample label of the third training sample and a prediction label of the third training sample.

In an embodiment, the target training model is:

$$\min_{W} \lambda R(W) + \sum_{l=1}^{L} \ell(y_l, \hat{y}_l) + \omega \sum_{l=L+1}^{\hat{L}} \ell(\sigma_l, \hat{y}_l).$$

Herein, W is a parameter of the recommendation model, R(W) is a regular term, λ represents a hyperparameter that determines a weight of the regular term, a training sample $x^1$ to a training sample $x^L$ in a training sample set $\{x^1, x^2, \ldots x^L, x^{L+1}, x^{L+2}, \ldots x^{\hat{L}}\}$ are the third training sample, a training sample $x^{L+1}$ to a training sample $x^{\hat{L}}$ are the first training sample, $\hat{L}$ represents a quantity of training samples in the training sample set, L represents a quantity of third training samples in the training sample set, $\sigma_l$ represents an interpolation prediction label $\sigma(x^l)$ of a training sample $x^l$, $y_l$ represents a sample label of the training sample $x^l$, $\hat{y}_l$ represents a prediction label of the training sample $x^l$, $\ell(y_l, \hat{y}_l)$ represents the second loss function, $\ell(\sigma_l, \hat{y}_l)$ represents the first loss function, and ω is a hyperparameter and is used to adjust weights of the first loss function and the second loss function.

In an embodiment, the interpolation model is selected based on a quantity of second training samples.

The following describes a training apparatus and a recommendation apparatus in the embodiments of this application in detail with reference to the accompanying drawings. It should be understood that the recommendation apparatus described below can perform the recommendation model training method in the foregoing embodiments of this application, and the recommendation apparatus can perform the recommendation method in the foregoing embodiments of this application. To avoid unnecessary repetition, repeated descriptions are properly omitted below when the recommendation apparatus in the embodiments of this application is described.

Figure 10:
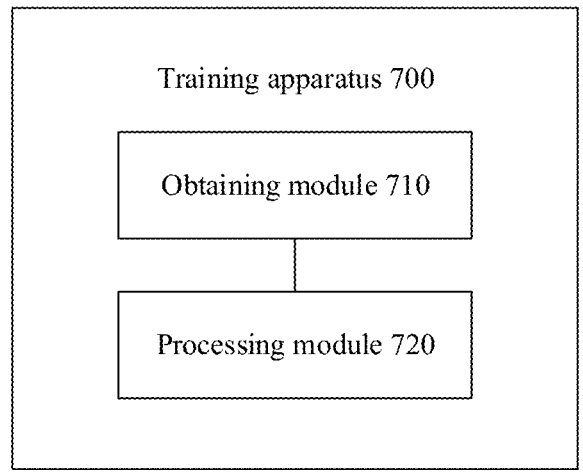
FIG. 10 is a schematic block diagram of a recommendation model training apparatus according to an embodiment of this application.

FIG. 10 is a schematic block diagram of a recommendation model training apparatus according to an embodiment of this application. The recommendation model training apparatus 700 shown in FIG. 10 includes an obtaining unit 710 and a processing unit 720.

The obtaining unit 710 and the processing unit 720 may be configured to perform the recommendation model training method in the embodiments of this application. Specifically, the obtaining unit 710 may perform operation 310 or operation 410, and the processing unit 720 may perform operation 320 and operation 330 or operation 420 to operation 440.

The obtaining unit 710 is configured to obtain at least one first training sample, where the first training sample includes attribute information of a first user and information about a first recommended object. The processing unit 720 is configured to process the attribute information of the first user and the information about the first recommended object based on an interpolation model, to obtain an interpolation prediction label of the first training sample, where the interpolation prediction label is used to indicate prediction about whether the first user performs an operational action on the first recommended object when the first recommended object is recommended to the first user, a model parameter of the interpolation model is obtained by performing training based on at least one second training sample, the at least one second training sample includes attribute information of a second user, information about a second recommended object, and a sample label of the second training sample, the sample label of the second training sample is used to indicate whether the second user performs an operational action on the second recommended object, and the second training sample is obtained when the second recommended object is randomly displayed to the second user. The processing unit 720 is further configured to perform training by using the attribute information of the first user and the information about the first recommended object in the first training sample as an input to the recommendation model and using the interpolation prediction label of the first training sample as a target output value of the recommendation model, to obtain a trained recommendation model.

In an embodiment, the obtaining unit 710 is further configured to obtain at least one third training sample, where the third training sample includes attribute information of a third user, information about a third recommended object, and a sample label of the third training sample, and the sample label of the third training sample is used to indicate whether the third user performs an operational action on the third recommended object. The processing unit 720 is further configured to perform training based on a target training model by using the attribute information of the first user, the information about the first recommended object, the attribute information of the third user, and the information about the third recommended object as the input to the recommendation model and using the interpolation prediction label of the first training sample and the sample label of the third training sample as the target output value of the recommendation model, to obtain the trained recommendation model.

In an embodiment, the first training sample may be obtained when the first recommended object is not displayed to the first user, and the third training sample may be obtained when the third recommended object is displayed to the third user.

In an embodiment, the target training model includes a first loss function and a second loss function, the first loss function is used to indicate a difference between the interpolation prediction label of the first training sample and a prediction label of the first training sample, and the second loss function is used to indicate a difference between the sample label of the third training sample and a prediction label of the third training sample.

In an embodiment, the target training model is:

$$\min_{W} \lambda R(W) + \sum_{l=1}^{L} \ell(y_l, \hat{y}_l) + \omega \sum_{l=L+1}^{\hat{L}} \ell(\sigma_l, \hat{y}_l).$$

Herein, W is a parameter of the recommendation model, R(W) is a regular term, λ represents a hyperparameter that determines a weight of the regular term, a training sample $x^1$ to a training sample $x^L$ in a training sample set $\{x^1, x^2, \ldots x^L, x^{L+1}, x^{L+2}, \ldots x^{\hat{L}}\}$ are the third training sample, a training sample $x^{L+1}$ to a training sample $x^{\hat{L}}$ are the first training sample, $\hat{L}$ represents a quantity of training samples in the training sample set, L represents a quantity of third training samples in the training sample set, $\sigma_l$ represents an interpolation prediction label $\sigma(x^l)$ of a training sample $x^l$, $y_l$ represents a sample label of the training sample $x^l$, $\hat{y}_l$ represents a prediction label of the training sample $x^l$, $\ell(y_l, \hat{y}_l)$ represents the second loss function, $\ell(\sigma_l, \hat{y}_l)$ represents the first loss function, and ω is a hyperparameter and is used to adjust weights of the first loss function and the second loss function.

In an embodiment, the interpolation model is selected based on a quantity of second training samples.

Figure 11:
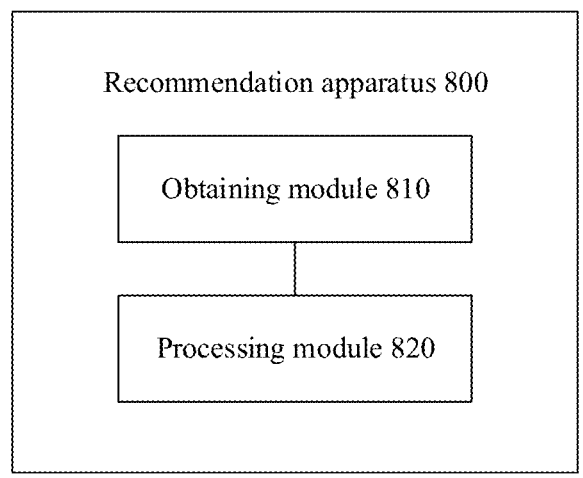
FIG. 11 is a schematic block diagram of a recommendation apparatus according to an embodiment of this application.

FIG. 11 is a schematic block diagram of a recommendation apparatus 800 according to an embodiment of this application. The recommendation apparatus 800 shown in FIG. 11 includes an obtaining unit 810 and a processing unit 820.

The obtaining unit 810 and the processing unit 820 may be configured to perform the recommendation method in the embodiments of this application. Specifically, the obtaining unit 810 may perform operation 610, and the processing unit 820 may perform operation 620.

The obtaining unit 810 is configured to obtain attribute information of a target recommendation user and information about a candidate recommended object. The processing unit 820 is configured to: input the attribute information of the target recommendation user and the information about the candidate recommended object into a recommendation model, and predict a probability that the target recommendation user performs an operational action on the candidate recommended object. A model parameter of the recommendation model is obtained by performing training by using attribute information of a first user and information about a first recommended object in a first training sample as an input to the recommendation model and using an interpolation prediction label of the first training sample as a target output value of the recommendation model, the interpolation prediction label of the first training sample is obtained by processing the attribute information of the first user and the information about the first recommended object based on an interpolation model, the interpolation prediction label is used to indicate prediction about whether the first user performs an operational action on the first recommended object when the first recommended object is recommended to the first user, a model parameter of the interpolation model is obtained by performing training based on at least one second training sample, the second training sample includes attribute information of a second user, information about a second recommended object, and a sample label of the second training sample, the sample label of the second training sample is used to indicate whether the second user performs an operational action on the second recommended object, and the second training sample is obtained when the second recommended object is randomly displayed to the second user.

In an embodiment, that a model parameter of the recommendation model is obtained by performing training by using attribute information of a first user and information about a first recommended object in a first training sample as an input to the recommendation model and using an interpolation prediction label of the first training sample as a target output value of the recommendation model includes: The model parameter of the recommendation model is obtained based on a target training model by using the attribute information of the first user, the information about the first recommended object, and attribute information of a third user and information about a third recommended object in a third training sample as the input to the recommendation model and using the interpolation prediction label of the first training sample and a sample label of the third training sample as the target output value of the recommendation model. The sample label of the third training sample is used to indicate whether the third user performs an operational action on the third recommended object.

In an embodiment, the first training sample may be obtained when the first recommended object is not displayed to the first user, and the third training sample may be obtained when the third recommended object is displayed to the third user.

In an embodiment, the target training model includes a first loss function and a second loss function, the first loss function is used to indicate a difference between a sample label of the first type of training sample and a prediction label of the first type of training sample, and the second loss function is used to indicate a difference between an interpolation prediction label of the second type of training sample and a prediction label of the second type of training sample.

In an embodiment, the target training model is:

$$\min_W \lambda R(W) + \sum_{l=1}^{L} \ell(y_l, \hat{y}_l) + \omega \sum_{l=L+1}^{\hat{L}} \ell(\sigma_l, \hat{y}_l).$$

Herein, W is a parameter of the recommendation model, R(W) is a regular term, λ represents a hyperparameter that determines a weight of the regular term, a training sample $x^1$ to a training sample $x^L$ in a training sample set $\{x^1, x^2, \ldots x^L, x^{L+1}, x^{L+2}, \ldots x^{\hat{L}}\}$ are the third training sample, a training sample $x^{L+1}$ to a training sample $x^{\hat{L}}$ are the first training sample, $\hat{L}$ represents a quantity of training samples in the training sample set, L represents a quantity of third training samples in the training sample set, $\sigma_l$ represents an interpolation prediction label $\sigma(x^l)$ of a training sample $x^l$, $y_l$ represents a sample label of the training sample $x^l$, $\hat{y}_l$ represents a prediction label of the training sample $x^l$, $\ell(y_l, \hat{y}_l)$ represents the second loss function, $\ell(\sigma_l, \hat{y}_l)$ represents the first loss function, and ω is a hyperparameter and is used to adjust weights of the first loss function and the second loss function.

In an embodiment, the interpolation model is selected based on a quantity of second training samples.

It should be noted that the training apparatus 700 and the apparatus 800 are embodied in a form of function units. The term "unit" herein may be implemented in a form of software and/or hardware. This is not limited.

For example, the "unit" may be a software program, a hardware circuit, or a combination thereof that implements the foregoing functions. The hardware circuit may include an application-specific integrated circuit (application-specific integrated circuit, ASIC), an electronic circuit, a processor (for example, a shared processor, a dedicated processor, or a group processor) and a memory that are configured to execute one or more software or firmware programs, a merged logic circuit, and/or another suitable component that supports the described functions.

Therefore, the units in the examples described in the embodiments of this application can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

Figure 12:
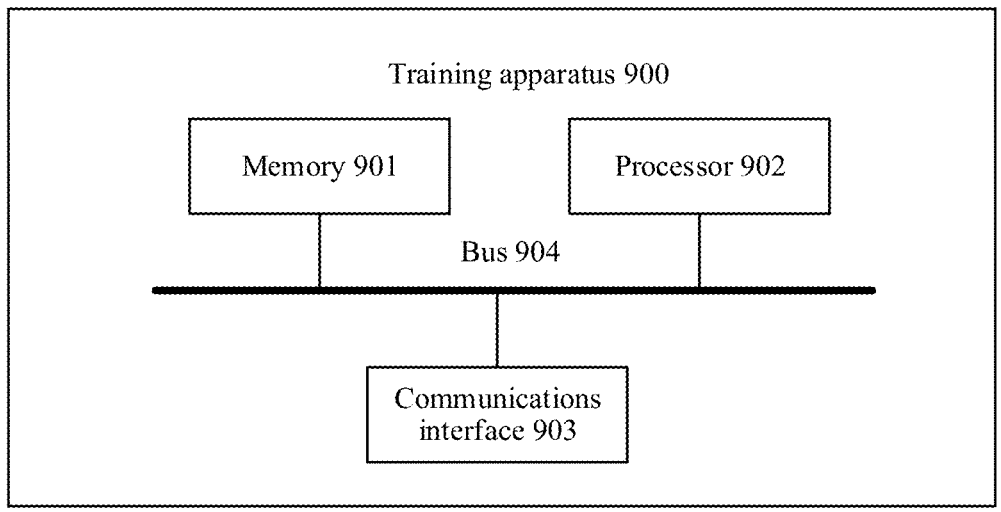
FIG. 12 is a schematic block diagram of a recommendation model training apparatus according to an embodiment of this application.

FIG. 12 is a schematic diagram of a hardware structure of a recommendation model training apparatus according to an embodiment of this application. The training apparatus 900 (the apparatus 900 may be a computer device) shown in FIG. 12 includes a memory 901, a processor 902, a communications interface 903, and a bus 904. The memory 901, the processor 902, and the communications interface 903 are communicatively connected to each other through the bus 1004.

The memory 901 may be a read-only memory (read-only memory, ROM), a static storage device, a dynamic storage device, or a random access memory (random access memory, RAM). The memory 901 may store a program.

When the program stored in the memory 901 is executed by the processor 902, the processor 902 is configured to perform the operations of the recommendation model training method in the embodiments of this application, for example, perform the operations shown in FIG. 5 or FIG. 6.

It should be understood that the training apparatus shown in this embodiment of this application may be a server, for example, may be a server in the cloud, or may be a chip configured in the server in the cloud.

The processor 902 may be a general-purpose central processing unit (CPU), a microprocessor, an application-specific integrated circuit (ASIC), a graphics processing unit (GPU), or one or more integrated circuits, and is configured to execute a related program, to implement the recommendation model training method in the method embodiments of this application.

Alternatively, the processor 902 may be an integrated circuit chip, and has a signal processing capability. In an implementation process, the operations of the recommendation model training method in this application may be completed by using a hardware integrated logic circuit or an instruction in a form of software in the processor 902.

Alternatively, the processor 902 may be a general-purpose processor, a digital signal processor (DSP), an application-specific integrated circuit (ASIC), a field programmable gate array (FPGA) or another programmable logic device, a discrete gate or a transistor logic device, or a discrete hardware component. The methods, operations, and logical block diagrams that are disclosed in the embodiments of this application may be implemented or performed. The general-purpose processor may be a microprocessor, or the processor may be any conventional processor or the like. The operations of the methods disclosed with reference to the embodiments of this application may be directly executed and completed by using a hardware decoding processor, or may be executed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 901. The processor 902 reads information in the memory 901, and completes, in combination with hardware of the processor 902, functions that need to be performed by the units included in the training apparatus shown in FIG. 9 in the embodiments of this application, or performs the recommendation model training method shown in FIG. 5 or FIG. 6 in the method embodiments of this application.

The communications interface 903 uses a transceiver apparatus, for example but not for limitation, a transceiver, to implement communication between the training apparatus 900 and another device or a communications network.

The bus 904 may include a path for transmitting information between the components (for example, the memory 901, the processor 902, and the communications interface 903) of the training apparatus 900.

Figure 13:
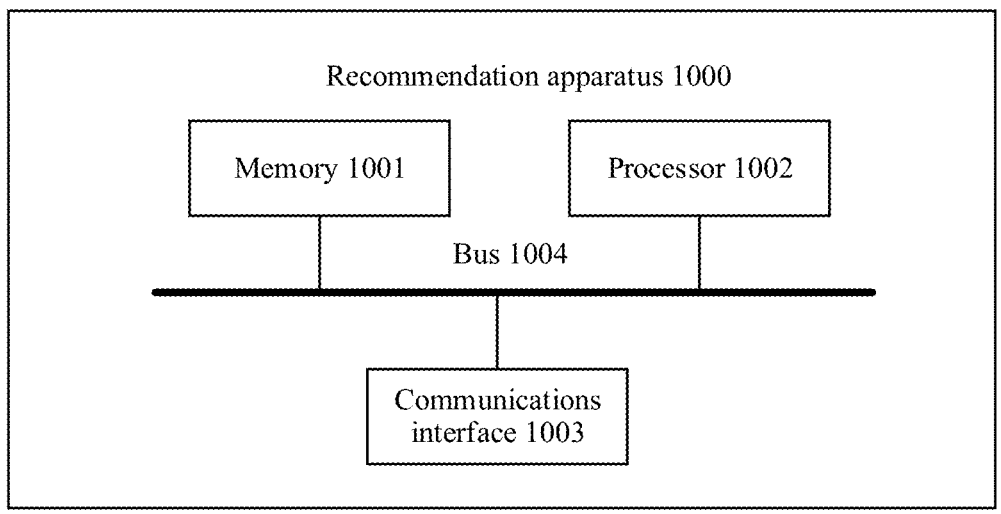
FIG. 13 is a schematic block diagram of a recommendation apparatus according to an embodiment of this application.

FIG. 13 is a schematic diagram of a hardware structure of a recommendation apparatus according to an embodiment of this application. The recommendation apparatus 1000, which may be a computer device, shown in FIG. 13 includes a memory 1001, a processor 1002, a communications interface 1003, and a bus 004. The memory 1001, the processor 1002, and the communications interface 1003 are communicatively connected to each other through the bus 1004.

The memory 1001 may be a read-only memory (ROM), a static storage device, a dynamic storage device, or a random access memory (RAM). The memory 1001 may store a program. When the program stored in the memory 1001 is executed by the processor 1002, the processor 1002 is configured to perform the operations of the recommendation method in the embodiments of this application, for example, perform the operations shown in FIG. 8.

It should be understood that the apparatus shown in this embodiment of this application may be an intelligent terminal, or may be a chip configured in the intelligent terminal.

The processor 1002 may be a general-purpose central processing unit (CPU), a microprocessor, an application-specific integrated circuit (ASIC), a graphics processing unit (GPU), or one or more integrated circuits, and is configured to execute a related program, to implement the selection probability prediction method in the method embodiments of this application.

Alternatively, the processor 1002 may be an integrated circuit chip, and has a signal processing capability. In an implementation process, the operations of the selection probability prediction method in this application may be completed by using a hardware integrated logic circuit or an instruction in a form of software in the processor 1002.

Alternatively, the processor 1002 may be a general-purpose processor, a digital signal processor (DSP), an application-specific integrated circuit (ASIC), a field programmable gate array (FPGA) or another programmable logic device, a discrete gate or a transistor logic device, or a discrete hardware component. The methods, operations, and logical block diagrams that are disclosed in the embodiments of this application may be implemented or performed. The general-purpose processor may be a microprocessor, or the processor may be any conventional processor or the like. The operations of the methods disclosed with reference to the embodiments of this application may be directly executed and completed by using a hardware decoding processor, or may be executed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 1001. The processor 1002 reads information in the memory 1001, and completes, in combination with hardware of the processor 1002, functions that need to be performed by the units included in the apparatus shown in FIG. 10 in the embodiments of this application, or performs the recommendation method shown in FIG. 8 in the method embodiments of this application.

The communications interface 1003 uses a transceiver apparatus, for example but not for limitation, a transceiver, to implement communication between the apparatus 1000 and another device or a communications network.

The bus 1004 may include a path for transmitting information between the components (for example, the memory 1001, the processor 1002, and the communications interface 1003) of the apparatus 1000.

It should be noted that, although only the memory, the processor, and the communications interface are shown in each of the training apparatus 900 and the apparatus 1000, in a specific implementation process, a person skilled in the art should understand that the training apparatus 900 and the apparatus 1000 each may further include another component necessary for normal running. In addition, based on a specific requirement, a person skilled in the art should understand that the training apparatus 900 and the apparatus 1000 each may further include a hardware component for implementing another additional function. In addition, a person skilled in the art should understand that the training apparatus 900 and the apparatus 1000 each may include only components necessary for implementing the embodiments of this application, but not necessarily include all the components shown in FIG. 12 or FIG. 13.

It should be further understood that, in the embodiments of this application, the memory may include a read-only memory and a random access memory, and provide an instruction and data for the processor. A part of the processor may further include a non-volatile random access memory. For example, the processor may further store information of a device type.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm operations can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the operations of the methods described in the embodiments of this application. The foregoing storage medium includes any medium that can store program code, such as a universal serial bus flash disk (USB flash disk, UFD), a removable hard disk, a read-only memory (read-only memory, ROM), a random access memory (random access memory, RAM), a magnetic disk, or a compact disc. The UFD may also be briefly referred to as a USB flash drive or a USB flash drive.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method performed by a model training device for training a recommendation model, comprising:

obtaining at least one first training sample having attribute information of a first user and information about a first recommended object;

processing the attribute information of the first user and the information about the first recommended object based on an interpolation model, to obtain an interpolation prediction label of the first training sample, wherein the interpolation prediction label is used to indicate prediction about whether the first user performs an operational action on the first recommended object when the first recommended object is recommended to the first user, wherein a model parameter of the interpolation model is obtained by performing training based on at least one second training sample having attribute information of a second user, information about a second recommended object, and a sample label of the at least one second training sample, the sample label of the at least one second training sample is used to indicate whether the second user performs an operational action on the second recommended object, and the at least one second training sample is obtained when the second recommended object is randomly displayed to the second user;

obtaining at least one third training sample having attribute information of a third user, information about a third recommended object, and a sample label of the at least one third training sample, wherein the sample label of the at least one third training sample is used to indicate whether the third user performs an operational action on the third recommended object; and performing training based on a target training model using the attribute information of the first user, the information about the first recommended object, the attribute information of the third user, and the information about the third recommended object as an input to a recommendation model, and using the interpolation prediction label of the at least one first training sample and the sample label of the at least one third training sample as a target output value of the recommendation model, to obtain a trained recommendation model, wherein the training comprises iteratively comparing a difference between an actual output value of the recommendation model with the target output value, and adjusting parameters of the recommendation model based on the difference.

2. The method according to claim 1, wherein the target training model comprises a first loss function and a second loss function, the first loss function is used to indicate a difference between the interpolation prediction label of the at least one first training sample and a prediction label of the at least one first training sample, and the second loss function is used to indicate a difference between the sample label of the at least one third training sample and a prediction label of the at least one third training sample.

3. The method according to claim 2, wherein the target training model is:

$$\min_W \lambda R(W) + \sum_{l=1}^{L} \ell(y_l, \hat{y}_l) + \omega \sum_{l=L+1}^{\tilde{L}} \ell(\sigma_l, \hat{y}_l),$$

W is a parameter of the recommendation model, R(W) is a regular term, $\lambda$ represents a hyperparameter that determines a weight of the regular term, a training sample $x^l$ to a training sample $x^L$ in a training sample set $\{x^1, x^2, \ldots x^L, x^{L+1}, x^{L+2}, \ldots x^{\tilde{L}}\}$ are part of the at least one third training sample, a training sample $x^{L+1}$ to a training sample $x^{\tilde{L}}$ are part of the at least one first training sample, $\tilde{L}$ represents a quantity of training samples in the training sample set, L represents a quantity of the third training samples in the training sample set, $\sigma_l$ represents an interpolation prediction label $\sigma(x^l)$ of a training sample $x^l$, $y_l$ represents a sample label of the training sample $x^l$, $\hat{y}_l$ represents a prediction label of the training sample $x^l$, $\ell(y_l, \hat{y}_l)$ represents the second loss function, $\ell(\sigma_l, \hat{y}_l)$ represents the first loss function, and $\omega$ is a hyperparameter used to adjust weights of the first loss function and the second loss function.

4. The method according to claim 1, wherein the interpolation model is selected based on a quantity of the second training samples.

5. A method performed by a computing device for providing recommendation, comprising:

obtaining attribute information of a target recommendation user and information about a candidate recommended object; and inputting the attribute information of the target recommendation user and the information about the candidate recommended object into a recommendation model, and predicting a probability that the target recommendation user performs an operational action on the candidate recommended object, wherein an interpolation prediction label of the at least one first training sample is obtained by processing the attribute information of the first user and the information about the first recommended object based on an interpolation model, the interpolation prediction label is used to indicate prediction about whether the first user performs an operational action on the first recommended object when the first recommended object is recommended to the first user, wherein a model parameter of the interpolation model is obtained by performing training based on at least one second training sample having attribute information of a second user, information about a second recommended object, and a sample label of the at least one second training sample, the sample label of the at least one second training sample is used to indicate whether the second user performs an operational action on the second recommended object, and the at least one second training sample is obtained when the second recommended object is randomly displayed to the second user, wherein a model parameter of the recommendation model is obtained by performing training based on a target training model using attribute information of a first user and information about a first recommended object in at least one first training sample, attribute information of a third user, and information about a third recommended object in at least one third training sample as an input to the recommendation model, and using an interpolation prediction label of the at least one first training sample and a sample label of the at least one third training sample as a target output value of the recommendation model, wherein the sample label of the at least one third training sample is used to indicate whether the third user performs an operational action on the third recommended object wherein the training comprises iteratively comparing a difference between an actual output value of the recommendation model with the target output value, and adjusting parameters of the recommendation model based on the difference.

6. The method according to claim 5, wherein the target training model comprises a first loss function and a second loss function, the first loss function is used to indicate a difference between the interpolation prediction label of the at least one first training sample and a prediction label of the at least one first training sample, and the second loss function is used to indicate a difference between the sample label of the at least one third training sample and a prediction label of the at least one third training sample.

7. The method according to claim 6, wherein the target training model is:

$$\min_{W} \lambda R(W) + \sum_{l=1}^{L} \ell(y_l, \hat{y}_l) + \omega \sum_{l=L+1}^{\hat{L}} \ell(\sigma_l, \hat{y}_l),$$

W is a parameter of the recommendation model, R(W) is a regular term, $\lambda$ represents a hyperparameter that determines a weight of the regular term, a training sample $x^1$ to a training sample $x^L$ in a training sample set $\{x^1, x^2, \ldots x^L, x^{L+1}, x^{L+2}, \ldots x^{\hat{L}}\}$ are part of the at least one third training sample, a training sample $x^{L+1}$ to a training sample $x^{\hat{L}}$ are part of the at least one first training sample, $\hat{L}$ represents a quantity of training samples in the training sample set, L represents a quantity of the third training samples in the training sample set, $\sigma_l$ represents an interpolation prediction label $\sigma(x^l)$ of a training sample $x^l$, $y_l$ represents a sample label of the training sample $x^l$, $\hat{y}_l$ represents a prediction label of the training sample $x^l$, $\ell(y_l, \hat{y}_l)$ represents the second loss function, $\ell(\sigma_l, \hat{y}_l)$ represents the first loss function, and $\omega$ is a hyperparameter and is used to adjust weights of the first loss function and the second loss function.

8. The method according to claim 5, wherein the interpolation model is selected based on a quantity of the second training samples.

9. An apparatus, comprising:
a processor; and
a memory coupled to the processor and storing instructions therein, which when executed by the processor, cause the processor to perform operations, the operations comprising:
obtaining at least one first training sample having attribute information of a first user and information about a first recommended object;
processing the attribute information of the first user and the information about the first recommended object based on an interpolation model, to obtain an interpolation prediction label of the at least one first training sample, wherein the interpolation prediction label is used to indicate prediction about whether the first user performs an operational action on the first recommended object when the first recommended object is recommended to the first user, wherein a model parameter of the interpolation model is obtained by performing training based on at least one second training sample having attribute information of a second user, information about a second recommended object, and a sample label of the at least one second training sample, the sample label of the at least one second training sample is used to indicate whether the second user performs an operational action on the second recommended object, and the at least one second training sample is obtained when the second recommended object is randomly displayed to the second user;
obtaining at least one third training sample having attribute information of a third user, information about a third recommended object, and a sample label of the at least one third training sample, wherein the sample label of the at least one third training sample is used to indicate whether the third user performs an operational action on the third recommended object; and
performing training based on a target training model using the attribute information of the first user, the information about the first recommended object, the attribute information of the third user, and the information about the third recommended object as an input to a recommendation model, and using the interpolation prediction label of the first training sample and the sample label of the at least one third training sample as a target output value of the recommendation model, to obtain a trained recommendation model, wherein the training comprises iteratively comparing a difference between an actual output value of the recommendation model with the target output value, and adjusting parameters of the recommendation model based on the difference.

10. The apparatus according to claim 9, wherein the target training model comprises a first loss function and a second loss function, the first loss function is used to indicate a difference between the interpolation prediction label of the first training sample and a prediction label of the first training sample, and the second loss function is used to indicate a difference between the sample label of the third training sample and a prediction label of the third training sample.

11. The apparatus according to claim 10, wherein the target training model is:

$$\min_{W} \lambda R(W) + \sum_{l=1}^{L} \ell(y_l, \hat{y}_l) + \omega \sum_{l=L+1}^{\hat{L}} \ell(\sigma_l, \hat{y}_l),$$

W is a parameter of the recommendation model, R(W) is a regular term, λ represents a hyperparameter that determines a weight of the regular term, a training sample $x^1$ to a training sample $x^L$ in a training sample set $\{x^1, x^2, \ldots x^L, x^{L+1}, x^{L+2}, \ldots x^{\hat{L}}\}$ are part of the at least one third training sample, a training sample $x^{L+1}$ to a training sample $x^{\hat{L}}$ are part of the at least one first training sample, $\hat{L}$ represents a quantity of training samples in the training sample set, L represents a quantity of the third training samples in the training sample set, $\sigma_l$ represents an interpolation prediction label $\sigma(x^l)$ of a training sample $x^l$, $y_l$ represents a sample label of the training sample $x_1$, $\hat{y}_l$ represents a prediction label of the training sample $x^l$, $\ell(y_l, \hat{y}_l)$ represents the second loss function, $\ell(\sigma_l, \hat{y}_l)$ represents the first loss function, and ω is a hyperparameter and is used to adjust weights of the first loss function and the second loss function.

12. The apparatus according to claim 9, wherein the interpolation model is selected based on a quantity of the second training samples.

13. An apparatus, comprising:
a processor; and
a memory coupled to the processor to store instructions, which when executed by the processor, cause the processor to perform operations, the operations comprising:
obtaining attribute information of a target recommendation user and information about a candidate recommended object;
inputting the attribute information of the target recommendation user and the information about the candidate recommended object into a recommendation model; and
predicting, using the recommendation model, a probability that the target recommendation user performs an operational action on the candidate recommended object,
wherein an interpolation prediction label of the at least one first training sample is obtained by processing the attribute information of the first user and the information about the first recommended object based on an interpolation model, the interpolation prediction label is used to indicate prediction about whether the first user performs an operational action on the first recommended object when the first recommended object is recommended to the first user,
wherein a model parameter of the interpolation model is obtained by performing training based on at least one second training sample having attribute information of a second user, information about a second recommended object, and a sample label of the at least one second training sample, wherein the sample label of the at least one second training sample is used to indicate whether the second user performs an operational action on the second recommended object, and the at least one second training sample is obtained when the second recommended object is randomly displayed to the second user,
wherein a model parameter of the recommendation model is obtained by performing training based on a target training model using attribute information of a first user and information about a first recommended object in at least one first training sample, attribute information of a third user, and information about a third recommended object in at least one third training sample as an input to the recommendation model, and using an interpolation prediction label of the at least one first training sample and a sample label of the at least one third training sample as a target output value of the recommendation model, wherein the sample label of the at least one third training sample is used to indicate whether the third user performs an operational action on the third recommended object, wherein the training comprises iteratively comparing a difference between an actual output value of the recommendation model with the target output value, and adjusting parameters of the recommendation model based on the difference.

14. The apparatus according to claim 13, wherein the target training model comprises a first loss function and a second loss function, the first loss function is used to indicate a difference between the interpolation prediction label of the first training sample and a prediction label of the first training sample, and the second loss function is used to indicate a difference between the sample label of the at least one third training sample and a prediction label of the at least one third training sample.

15. The apparatus according to claim 14, wherein the target training model is:

$$\min_{W} \lambda R(W) + \sum_{l=1}^{L} \ell(y_l, \hat{y}_l) + \omega \sum_{l=L+1}^{\hat{L}} \ell(\sigma_l, \hat{y}_l),$$

W is a parameter of the recommendation model, R(W) is a regular term, λ represents a hyperparameter that determines a weight of the regular term, a training sample $x^1$ to a training sample $x^L$ in a training sample set $\{x^1, x^2, \ldots x^L, x^{L+1}, x^{L+2}, \ldots x^{\hat{L}}\}$ are part of the at least one third training sample, a training sample $x^{L+1}$ to a training sample $x^{\hat{L}}$ are part of the at least one first training sample, $\hat{L}$ represents a quantity of training samples in the training sample set, L represents a quantity of third training samples in the training sample set, $\sigma_l$ represents an interpolation prediction label $\sigma(x^l)$ of a training sample $x^l$, $y_l$ represents a sample label of the training sample $x^l$, $\hat{y}_l$ represents a prediction label of the training sample $x^l$, $\ell(y_l, \hat{y}_l)$ represents the second loss function, $\ell(\sigma_l, \hat{y}_l)$ represents the first loss function, and ω is a hyperparameter and is used to adjust weights of the first loss function and the second loss function.

16. The apparatus according to claim 13, wherein the interpolation model is selected based on a quantity of the second training samples.

* * * * *